US012293487B2

(12) United States Patent
Kong et al.

(10) Patent No.: US 12,293,487 B2
(45) Date of Patent: May 6, 2025

(54) ELECTRONIC DEVICE PERFORMING IMAGE INPAINTING AND METHOD OF OPERATING THE SAME

(71) Applicant: Samsung Electronics Co., Ltd., Suwon-si (KR)

(72) Inventors: Naejin Kong, Suwon-si (KR); Harshith Goka, Suwon-si (KR); Kiwoong Park, Suwon-si (KR); Roman Suvorov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 17/746,429

(22) Filed: May 17, 2022

(65) Prior Publication Data

US 2022/0375050 A1 Nov. 24, 2022

Related U.S. Application Data

(63) Continuation of application No. PCT/KR2022/006289, filed on May 3, 2022.

(30) Foreign Application Priority Data

May 18, 2021 (KR) .................. 10-2021-0064335
Aug. 2, 2021 (KR) .................. 10-2021-0101523

(51) Int. Cl.
*G06T 5/50* (2006.01)
*G06T 7/90* (2017.01)
(Continued)

(52) U.S. Cl.
CPC .............. *G06T 5/50* (2013.01); *G06T 7/90* (2017.01); *G06V 10/267* (2022.01); *G06V 10/774* (2022.01); *G06T 2207/20224* (2013.01)

(58) Field of Classification Search
CPC ... G06T 5/50; G06T 7/90; G06T 2207/20224; G06T 5/60; G06T 5/77;
(Continued)

(56) References Cited

U.S. PATENT DOCUMENTS 9,576,347 B2   2/2017   Abdollahian et al.
9,811,883 B2   11/2017  Cho et al.
(Continued)

FOREIGN PATENT DOCUMENTS

EP    3 048 579 A1    7/2016
WO    2020/101246 A1  5/2020

OTHER PUBLICATIONS

Mohamed Abbas Hedjazi et al., Learning to Inpaint by Progressively Growing the Mask Regions, 2019 IEEE/CVF International Conference on Computer Vision Workshop (ICCVW), IEEE, Oct. 27, 2019, pp. 4591-4596, XP033732296.
(Continued)

*Primary Examiner* — Solomon G Bezuayehu
(74) *Attorney, Agent, or Firm* — Jefferson IP Law, LLP

(57) ABSTRACT

An image inpainting method is provided. The image inpainting method includes determining a missing region in an original image, generating an input image to be reconstructed from the original image, based on the missing region, obtaining a mask image indicating the missing region, determining whether to extract a structural feature of the missing region, based on an attribute of the missing region, obtaining structure vectors each consisting of one or more lines and one or more junctions by applying the input image and the mask image to a first model for extracting a structural feature of the input image, and obtaining an inpainted image in which the missing region in the input image is reconstructed by applying the input image, the mask image, and a structure vector image converted from
(Continued)

the structure vectors to a second model for reconstructing the input image.

20 Claims, 25 Drawing Sheets

(51) Int. Cl.
 *G06V 10/26* (2022.01)
 *G06V 10/774* (2022.01)
(58) Field of Classification Search
 CPC .......... G06T 2207/20081; G06T 2207/20084; G06V 10/267; G06V 10/774; G06V 10/25; G06V 10/34; G06V 10/44; G06V 10/454; G06V 10/82; G06N 3/045; G06N 3/047; G06N 3/0475; G06N 3/094
 See application file for complete search history.

(56) References Cited

U.S. PATENT DOCUMENTS

| | | | |
|---|---|---|---|
| 10,290,085 B2 | 5/2019 | Lin et al. | |
| 10,650,499 B1 | 5/2020 | Fleizach | |
| 10,878,575 B2 | 12/2020 | Lin et al. | |
| 11,551,337 B2 | 1/2023 | Tagra et al. | |
| 11,815,468 B2* | 11/2023 | Kuno | G06N 20/00 |
| 2009/0284625 A1* | 11/2009 | Takemura | H04N 5/57 |
| | | | 348/254 |
| 2014/0355821 A1* | 12/2014 | Solem | G06V 10/7557 |
| | | | 382/103 |
| 2015/0371110 A1* | 12/2015 | Hwang | G06T 17/005 |
| | | | 382/201 |
| 2019/0295228 A1 | 9/2019 | Liu et al. | |
| 2020/0043181 A1* | 2/2020 | Kawai | G06V 20/41 |
| 2020/0411167 A1* | 12/2020 | Kearney | G06T 7/77 |
| 2021/0082124 A1 | 3/2021 | Lin et al. | |

OTHER PUBLICATIONS

Extended European Search Report dated Jun. 11, 2024, issued in European Patent Application No. 22804868.2.

Xue et al.; Holistically-Attracted Wireframe Parsing; Wuhan University, China, NC State University, USA, University of Oxford, UK; 2020.

Lin et al.; Deep Hough-Transform Line Priors; Computer Vision Lab Delft University of Technology, the Netherlands.

Nazeri et al.; EdgeConnect: Structure Guided Image Inpainting using Edge Prediction; University of Ontario Institute of Technology, Canada. http://www.ImagingLab.ca http://www.VCLab.ca.

Wang et al.; High-Resolution Image Synthesis and Semantic Manipulation with Conditional GANs; NVIDIA Corporation 2 UC Berkeley.

Xue et al.; Neural Wireframe Renderer: Learning Wireframe to Image Translations; College of Information Sciences and Technology, The Pennsylvania State University, University Park, PA 16802, USA; Jul. 17, 2020.

Isola et al.; Image-to-Image Translation with Conditional Adversarial Networks; Berkeley AI Research (BAIR) Laboratory, UC Berkeley, Nov. 26, 2018.

International Search Report dated Aug. 10, 2022, issued in an International Application No. PCT/KR2022/006289.

Chenjie Cao, Learning a Sketch Tensor Space for Image Inpainting of Man-made Scenes, arXiv:2103.15087v1, p. 1-26; Mar. 31, 2021, Fudan University.

* cited by examiner

FIG. 18
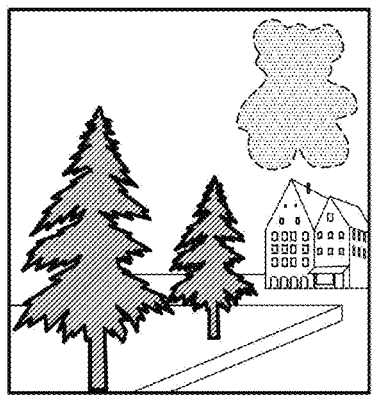
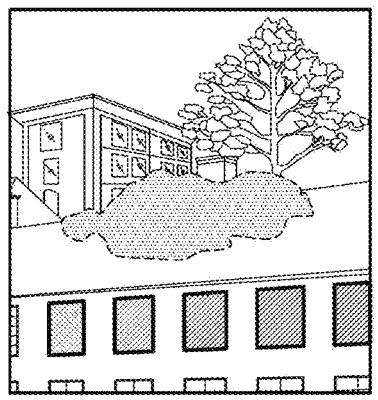
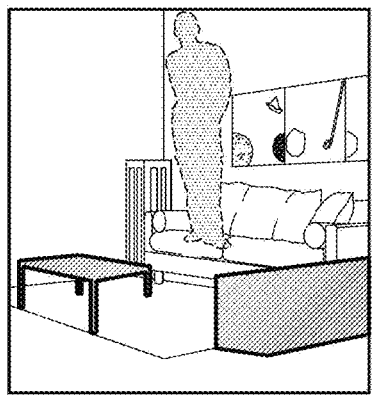
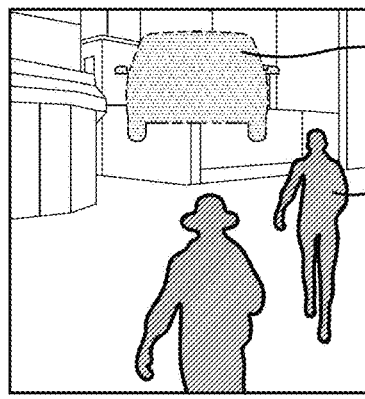
VERIFICATION IMAGE — 1800
▨ : MISSING REGION DETERMINED — 1810
　　 THROUGH OBJECT DETECTION
▰ : EXISTING OBJECT AREA DETERMINED — 1820
　　 THROUGH OBJECT DETECTION

ELECTRONIC DEVICE PERFORMING IMAGE INPAINTING AND METHOD OF OPERATING THE SAME

CROSS-REFERENCE TO RELATED APPLICATION(S)

This application is a continuation application, claiming priority under § 365(c), of an International application No. PCT/KR2022/006289, filed on May 3, 2022, which is based on and claims the benefit of a Korean patent application number 10-2021-0064335, filed on May 18, 2021, in the Korean Intellectual Property Office, and of a Korean patent application number 10-2021-0101523, filed on Aug. 2, 2021, in the Korean Intellectual Property Office, the disclosure of each of which is incorporated by reference herein in its entirety.

TECHNICAL FIELD

The disclosure relates to an electronic device for performing image inpainting to reconstruct an image by filling the image with pixels, and an operating method of the electronic device.

BACKGROUND ART

An image editing function using artificial intelligence has been provided as an image processing method performed to edit images by an electronic device. As an example of the image editing function using artificial intelligence, an electronic device provides an image inpainting technique for reconstructing an image by naturally filling damaged or empty regions in the image. The electronic device may use the image inpainting technique to reconstruct a damaged region in the image or delete a certain object in the image, thereby providing a user with an improved image editing experience.

When image inpainting is performed by the electronic device, noise such as blurring or distortion may occur in an inpainted image according to a shape, position, size, etc. of a damaged or empty region in the image.

In relation to the image inpainting technique, a method of generating a sharp and natural inpainted image regardless of a shape, position, size, etc. of a region to be reconstructed will be introduced herein.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic device for performing image inpainting and to an operating method of the electronic device.

Additional aspects will be set forth in part in the description which follows and, in part, will be apparent from the description, or may be learned by practice of the presented embodiments.

Technical Solution to Problem

In accordance with an aspect of the disclosure, a method of performing image inpainting by an electronic device to reconstruct a missing region in an image is provided. The method includes determining a missing region in an original image, generating an input image to be reconstructed from the original image, based on the determined missing region, obtaining a mask image indicating the missing region, determining whether to extract a structural feature of the missing region, based on an attribute of the missing region, obtaining structure vectors each consisting of one or more lines and one or more junctions by applying the input image and the mask image to a first model for extracting a structural feature of the input image, the input image including the structural feature of the missing region, and obtaining an inpainted image in which the missing region in the input image is reconstructed by applying the input image, the mask image, and a structure vector image converted from the structure vectors to a second model for reconstructing the input image.

In accordance with another aspect of the disclosure, an electronic device for performing image inpainting is provided. The electronic device includes a communication interface, a memory storing one or more instructions, and at least one processor configured to execute the one or more instructions stored in the memory, wherein the at least one processor is further configured to execute the one or more instructions to determine a missing region in an original image, generate an input image to be reconstructed from the original image, based on the determined missing region, obtain a mask image indicating the missing region, determine whether to extract a structural feature of the missing region, based on an attribute of the missing region, obtain structure vectors consisting of one or more lines and one or more junctions by applying the input image and the mask image to a first model for extracting a structural feature of the input image, the input image including the structural feature of the missing region, and obtain an inpainted image in which the missing region in the input image is reconstructed by applying the input image, the mask image, and a structure vector image converted from the structure vectors to a second model for reconstructing the input image.

Another aspect of the disclosure is to provide a computer-readable recording medium storing a program for causing a computer to perform the method of performing image inpainting by an electronic device to reconstruct a missing region in an image.

BRIEF DESCRIPTION OF DRAWINGS

The above and other aspects, features, and advantages of certain embodiments of the disclosure will be more apparent from the following description taken in conjunction with the accompanying drawings, in which:

FIG. 18 is a diagram for describing a method of generating, by an electronic device, verification data for verifying the accuracy of an inpainted image obtained using a trained second model, according to an embodiment of the disclosure;

Throughout the drawings, it should be noted that like reference numbers are used to depict the same or similar elements, features, and structures.

Mode of Disclosure

Figure 1:
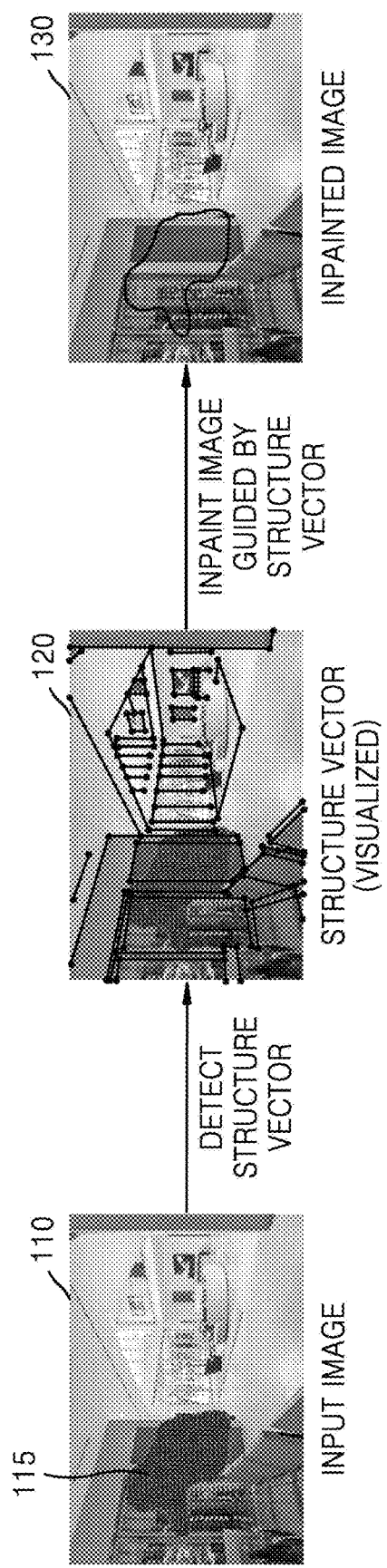
FIG. 1 is a schematic diagram for describing a method of obtaining, by an electronic device, an inpainted image in which a missing region in an image is reconstructed, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Throughout the disclosure, the expression "at least one of a, b or c" indicates only a, only b, only c, both a and b, both a and c, both b and c, all of a, b, and c, or variations thereof.

The terms used in the present specification will be briefly described and then the disclosure will be described in detail.

In the disclosure, general terms that have been widely used nowadays are selected, when possible, in consideration of functions of the disclosure, but non-general terms may be selected according to the intentions of technicians in the art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

As used herein, the singular expressions are intended to include plural forms as well, unless the context clearly dictates otherwise. The terms used herein, including technical or scientific terms, may have the same meanings as those generally understood by those of ordinary skill in the art of the present specification. Terms, including ordinal numbers such as "first" and "second", may be used herein to describe various components but the components should not be limited by the terms. The terms are only used to distinguish one component from another.

It will be understood that when an element is referred to as "including" or "comprising" another element, the element may further include or comprise other elements unless mentioned otherwise. Terms such as "unit", "module," and the like, when used herein, represent units for processing at least one function or operation, which may be implemented by hardware, software, or a combination of hardware and software.

Hereinafter, embodiments of the disclosure will be described in detail with reference to the accompanying drawings such that the embodiments of the disclosure may be easily implemented by those of ordinary skill in the art. However, the disclosure may be embodied in many different forms and is not limited to the embodiments of the disclosure set forth herein. For clarity, parts not related to explaining the disclosure are omitted in the drawings, and like components are denoted by like reference numerals throughout the specification.

In the disclosure, an input image to be reconstructed refers to an input image to be reconstructed by applying thereto an image inpainting algorithm according to embodiments of the disclosure described below. The input image may include a missing region.

In the disclosure, a missing region refers to a region to be reconstructed by applying thereto an image inpainting algorithm according to embodiments of the disclosure described below. A missing region refers to a region in an input image to be reconstructed, in which visual meaning, features, etc. are not identifiable due to a change of pixel values. In an inpainting algorithm according to embodiments of the disclosure, pixels corresponding to a missing region may be generated to fill the missing region. The pixels filling the missing region may be pixels generated to be naturally blended with peripheral regions of the missing region in terms of visual features. An inpainted image may be obtained by reconstructing a missing region in an input image to be reconstructed, according to embodiments of the disclosure set forth herein.

In the disclosure, a structure vector refers to a vector indicating structural features of structures included in an image. The structure vector may consist of points and lines. In the disclosure, a structure vector of a missing region refers to a vector obtained by inferring a structure expected to be included in the missing region in which visual meaning, features, etc. are not identifiable due to a change of pixel values, the vector indicating structural features of structures considered as being included in the missing region.

FIG. 1 is a schematic diagram for describing a method of obtaining, by an electronic device, an inpainted image in which a missing region in an image is reconstructed, according to an embodiment of the disclosure.

Referring to FIG. 1, an electronic device 2000 according to an embodiment of the disclosure may obtain an input image 110 to be reconstructed, extract geometric features of structures in the input image 110 to obtain structure vectors 120, and generate pixels corresponding to a missing region 115 of the input image 110 by using the obtained structure vectors 120 so as to obtain an inpainted image 130 in which the missing region 115 of the input image 110 is filled with the generated pixels. In this case, the structure vectors 120 may include structure vectors of the missing region 115.

In an embodiment of the disclosure, when the electronic device 2000 reconstructs the missing region 115 of the input image 110 by image inpainting, the electronic device 2000 may reconstruct input image 110, based on neighboring pixels of the missing region 115, so as to reconstruct the missing region 115 to match context of the input image 110. In this case, when a size of the missing region 115 is larger than a certain reference size, information obtained from the neighboring pixels of the missing region 115 is insufficient and thus the missing region 115 when reconstructed may become blurred or distorted. The electronic device 2000 according to an embodiment of the disclosure may reconstruct the missing region 115 by inferring content (e.g., structures, etc.) expected to be included in the reconstruct missing region 115 by using a generative adversarial network (GAN). Alternatively, the electronic device 2000 may reconstruct the missing region 115 by using a structure vector of the missing region 115, which is obtained by inferring a structure expected to be included in the missing region 115.

The electronic device 2000 according to an embodiment of the disclosure may be a device capable of photographing a subject by using a camera. For example, the electronic device 2000 may be, but is not limited to, a device such as a smart phone, a tablet personal computer (PC), a notebook PC, a desktop PC or a television (TV).

In an embodiment of the disclosure, the electronic device 2000 may include a camera module with a plurality of cameras. The camera module may include a depth camera for obtaining a depth image and and a red, green, blue (RGB) camera for obtaining an RGB image. The electronic device 2000 may obtain an image by using the camera module.

In an embodiment of the disclosure, the electronic device 2000 may obtain the input image 110 including the missing region 115 in which pixel values of some regions are changed.

The input image 110 may be obtained in various ways.

In an embodiment of the disclosure, the electronic device 2000 may obtain the input image 110 including the missing region 115 in which pixel values of some regions are changed, from another electronic device (e.g., a server 3000).

In an embodiment of the disclosure, the electronic device 2000 may obtain the input image 110 generated based on a user input from a user of the electronic device 2000. For example, when the user of the electronic device 2000 wants to delete a certain object from an undamaged original image, the electronic device 2000 may generate the input image 110, based on a user input. The electronic device 2000 may generate the input image 110 including the missing region 115 by receiving an input to select some regions of the original image from the user of the electronic device 2000 and changing pixel values of pixels corresponding to the selected regions. In this case, the original image may be obtained from another electronic device (e.g., the server 3000) by the electronic device 2000 or obtained by photographing a scene using the camera module by the electronic device 2000.

In an embodiment of the disclosure, the electronic device 2000 may extract structural features of structures in the input image 110. The electronic device 2000 may obtain the structure vectors 120 including at least one line and at least one junction by extracting structural features such as points, lines, planes, etc. of the structures in the input image 110. In this case, extracted structure vectors 120 may include a structure vector of a missing region.

The electronic device 2000 according to an embodiment of the disclosure may generate pixels corresponding to the missing region 115 of the input image 110, based on the structure vectors 120. The electronic device 2000 may guide a frame structure of a structure corresponding to the missing region 115 to generate the pixels corresponding to the missing region 115, based on the structure vectors 120. The electronic device 2000 may fill the missing region 115 with the generated pixels to obtain the inpainted image 130 in which the missing region 115 is reconstructed to match context of the input image 110.

Figure 2:
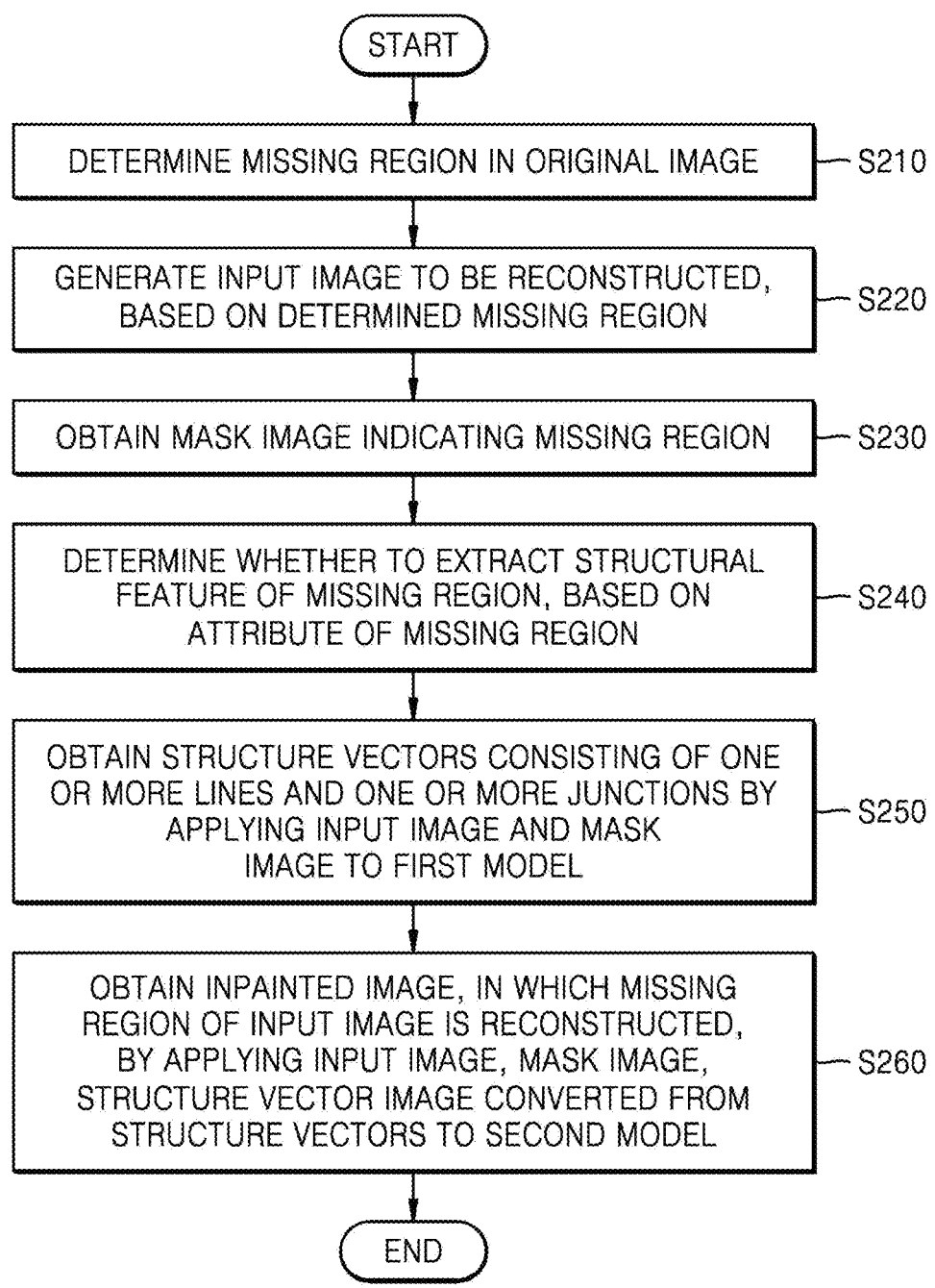
FIG. 2 is a flowchart of a method of obtaining, by an electronic device, an inpainted image by reconstructing a missing region, according to an embodiment of the disclosure.

FIG. 2 is a flowchart of a method of obtaining, by an electronic device, an inpainted image by reconstructing a missing region, according to an embodiment of the disclosure.

Referring to FIG. 2, in operation S210, the electronic device 2000 according to an embodiment of the disclosure may determine a missing region in an original image. The electronic device 2000 may obtain the original image and determine a missing region in the original image.

In an embodiment of the disclosure, the electronic device 2000 may obtain an original image to be inpainted. The original image may include, for example, an image including damaged regions or an image including an object to be deleted. The electronic device 2000 may obtain the original image by photographing a subject by using a camera thereof or receive the original image from another electronic device (e.g., the server 3000).

In the disclosure, a user input may be understood to include a various type of inputs. For example, when the electronic device 2000 includes a touch screen with a display and a touch pad, a user input may be touch data received through the touch screen. As another example, when a display and an input device are connected to the electronic device 2000, a user input may be input data received through the input device.

In an embodiment of the disclosure, the electronic device 2000 may determine a missing region, based on a user input. The electronic device 2000 may receive a user input to select a damaged region or a region to be deleted from the original image, and determine a missing region, based on the received user input.

For example, the electronic device 2000 may receive a user input to select a damaged region in the original image. The electronic device 2000 may determine the selected region as a missing region, based on the received user input.

For example, the electronic device 2000 may receive a user input (e.g., a closed curve type input, a brush type input, or the like) to select a certain region in the original image so as to the delete the region. The electronic device 2000 may determine the selected region as a missing region, based on the received user input.

For example, the user of the electronic device 2000 may receive a user input to select a certain object from the original image to delete the object. The electronic device 2000 may detect a boundary of a region corresponding to an object in the original image, based on a user input to select the object in the original image, and determine the region corresponding to the object as a missing region.

In an embodiment of the disclosure, the electronic device 2000 may identify objects in the original image and segment regions corresponding to the objects in the original image. The electronic device 2000 may receive an input to select some regions of an image from a user and determine a segmentation region related to the received input as a missing region.

In operation S220, the electronic device 2000 according to an embodiment of the disclosure may generate an input image to be reconstructed, based on the missing region determined in operation S210.

The electronic device 2000 may generate the input image including the missing region by changing pixel values of pixels corresponding to the determined missing region. In this case, the electronic device 2000 may change pixel value of pixels corresponding to some regions to a predetermined value. For example, the electronic device 2000 may change pixel values of pixels corresponding to some regions to 0 or an average value of pixel values of all images in training data. However, the changed pixel values are not limited thereto.

In operation S230, the electronic device 2000 according to an embodiment of the disclosure may obtain a mask image indicating the missing region. In this case, the mask image may include the missing region and a non-missing region. The mask image may include masking information masking the missing region. The masking information may include, but is not limited to, information (e.g., coordinate information) indicating a position of the missing region in the original image.

In operation S240, the electronic device 2000 according to an embodiment of the disclosure may determine whether to extract a structural feature of the missing region, based on an attribute of the missing region.

In an embodiment of the disclosure, the electronic device 2000 may determine whether to extract a structural feature of the missing region, based on a size of the missing region. For example, the electronic device 2000 may determine that a structural feature of the missing region is to be extracted, when the number of pixels corresponding to the missing region is greater than or equal to a predetermined number.

In an embodiment of the disclosure, the electronic device 2000 may determine whether to extract a structural feature of the missing region, based on a ratio of the missing region to an entire region of the input image. For example, the electronic device 2000 may determine to extract a structural feature of the missing region when a ratio of the number of pixels of the missing region to the number of pixels of the input image is greater than or equal to a predetermined value.

In an embodiment of the disclosure, the electronic device 2000 may determine whether to extract a structural feature of the missing region, based on a width of the missing region. The electronic device 2000 may obtain skeleton lines of the input image by applying a thinning algorithm for detecting pixels indicating a skeleton of the missing region, and determine to extract a structural feature of the input image when a width of the missing region measured in a vertical direction with respect to the skeleton lines of the missing region is greater than or equal to the predetermined value. For example, the electronic device 2000 may determine to extract a structural feature of the missing region when a maximum width of the missing region is greater than or equal to the predetermined value.

In operation S250, the electronic device 2000 according to an embodiment of the disclosure may obtain structure vectors consisting of one or more lines and one or more junctions by applying the input image and the mask image to a first model. The first model may be a neural network model for receiving the input image and the mask image and detecting geometric features, such as points, lines, and planes, which represent a frame structure of structures in the input image. The structure vectors may include a structural feature of the missing region identified by inferring a structural feature expected to be presented in a missing region in the input image, in which pixel values are changed. In this case, the structural feature of the missing region may be inferred from a structural feature of a region of the input image among all the regions of the input image, excluding the missing region. The first model may output structure vectors associated with the entire input image including the missing region, based on the input image and the mask image.

The missing region in the input image includes regions of the input image, in which the visual meanings of the regions are not identifiable due to a change of pixel values corresponding to the regions and thus a structural feature is prevented from being identified in the missing region. The electronic device 2000 may use a first model for extracting a structural feature of a missing region and thus may receive an input image to be reconstructed and infer a structural feature of a missing region at once rather than detecting edge regions of the input image and inferring a structure of a missing region, the structural feature of which is not detected, based on the detected edge regions.

In an embodiment of the disclosure, training data for training the first model may include training images each including a missing region and a mask image corresponding to the training images and indicating the missing region in each of the training images. Each of the training images may be labeled with structure vectors corresponding thereto. The electronic device 2000 may train the first model by using the training data. Alternatively, the electronic device 2000 may receive the trained first model from another electronic device (e.g., the server 3000).

In operation S260, the electronic device 2000 according to an embodiment of the disclosure may obtain an inpainted image, in which the missing region in the input image is reconstructed, by applying the input image, the mask image, a structure vector image converted from the structure vectors to a second model. The structure vectors may be output from the first model. The electronic device 2000 may convert the structure vectors output from the first model into the structure vector image. The electronic device 2000 may convert the structure vectors into the structure vector image, based on one or more lines, one or more junctions, and coordinate information corresponding to a position of each of the one or more lines and the one or more junctions. For example, the electronic device 2000 may generate a structure vector image in which the structure vectors are converted into a binary map. However, a format of the structure vector image converted from the structure vectors is not limited thereto, and the electronic device 2000 may generate the structure vector image by converting the structure vectors into an image representation form of vectors.

The inpainted image output from the second model may be an image obtained by filling the missing region with pixels generated to correspond to the missing region. In addition, the inpainted image may be an image obtained by reconstructing the missing region in the input image to be naturally blended with other regions of the input image, i.e., to match context of the input image.

Figure 3:
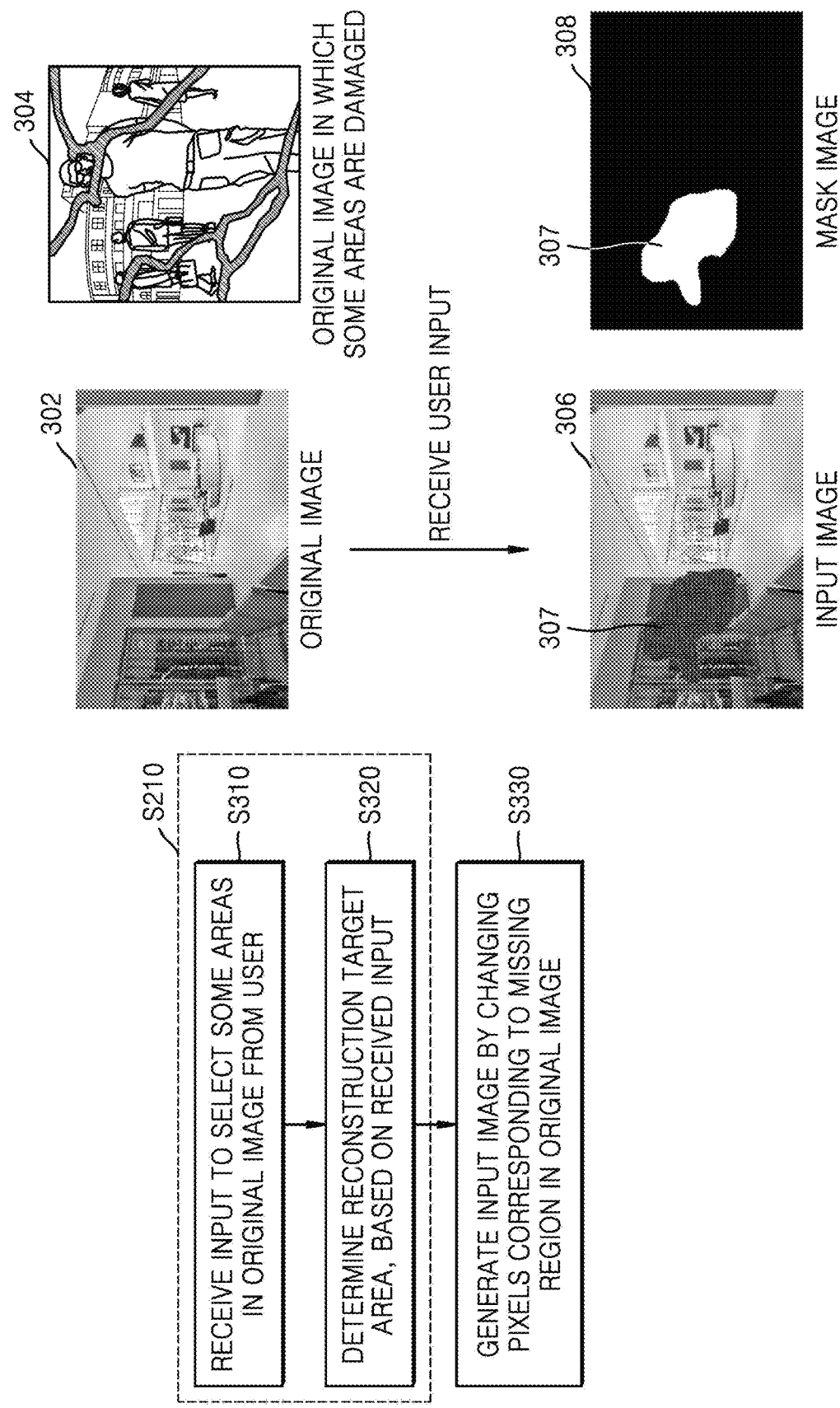
FIG. 3 is a diagram for describing a method of determining a missing region in an original image by an electronic device, according to an embodiment of the disclosure.

FIG. 3 is a diagram for describing a method of determining a missing region in an original image by an electronic device, according to an embodiment of the disclosure.

Referring to FIG. 3, operations S310 and S320 may correspond to operation S210 of FIG. 2, and operation S330 may correspond to operation S220 of FIG. 2.

In operation S310, the electronic device 2000 according to an embodiment of the disclosure may receive an input to select some regions of an original image 302 from a user. In an embodiment of the disclosure, a user of the electronic device 2000 may want to delete a certain region or a certain object in the original image. The electronic device 2000 may receive a user input to select a certain region or a certain object from the user.

In operation S320, the electronic device 2000 according to an embodiment of the disclosure may determine a missing region 307, based on an input received from the user. The electronic device 2000 may receive a user input to designate a region in the original image 302 to be deleted from the user, determine the missing region 307, and obtain a mask image 308 indicating the missing region 307.

In an embodiment of the disclosure, the electronic device 2000 may determine a region corresponding to a user input as the missing region 307. The user input may be input in various ways. For example, the electronic device 2000 may receive an input to draw a closed curve in an image, so that a closed curve region may be the missing region 307. The electronic device 2000 may determine the closed curve region in the original image 302 as the missing region 307, based on the received input. As another example, the electronic device 2000 may receive a brush input to mask a certain region in an image. The electronic device 2000 may determine as the missing region 30 a region in the original image 302, for which the brush input is received, based on the received input.

In an embodiment of the disclosure, the electronic device 2000 may determine the missing region 307 by inferring the missing region 307, based on a user input. In this case, the electronic device 2000 may use a neural network model that detects an object region, based on a spare data input.

For example, the electronic device 2000 may receive an input (e.g., a point type input, a scribble type input or the like) to intermittently select a portion of an object to be deleted from the original image 302 from a user. The electronic device 2000 may detect a boundary of a region of an object selected by the user from the original image 302 and determine the region within the detected boundary as the missing region 307.

In an embodiment of the disclosure, the user of the electronic device 2000 may want to reconstruct an original image 304 (e.g., an original image obtained by scanning an old picture) in which some regions are damaged. In this case, the electronic device 2000 may receive a user input to mask an input region, to be reconstructed, in the original image 304 in which some regions are damaged. The electronic device 2000 may determine, as a missing region, the region masked by the user in the original image 302 in some regions are damaged, based on the received input.

Although the embodiments of the disclosure have been described above, in which the electronic device 2000 determines a missing region, based on a user input, the user inputs described in these embodiments of the disclosure are only examples and the electronic device 2000 may receive various types of user inputs for determining a missing region.

In operation S330, the electronic device 2000 according to an embodiment of the disclosure may generate an input image to be reconstructed by changing pixels corresponding to the missing region 307, based on the missing region 307.

In an embodiment of the disclosure, the electronic device 2000 may change pixel values of the pixels corresponding to the missing region 307 determined based on the user input to select some regions in the original image 302. For example, the electronic device 2000 may calculate an average value of pixel values of pixels of all images included in training data. The electronic device 2000 may obtain an input image 306, which is to be reconstructed, by changing the pixel values of the pixels corresponding to the missing region 307 to the average value of the pixel values of the pixels of all the images in the training data. As another example, the electronic device 2000 may obtain the input image 306 by changing the pixel value of the pixels corresponding to the missing region 307 to 0.

In addition, the electronic device 2000 may obtain a mask image 308 indicating the missing region 307. In this case, the mask image 308 may include the missing region 307 and a non-missing region. The mask image 308 may include masking information masking the missing region 307.

A plurality of missing regions 307 may be determined from the original image 302. When there are a plurality of missing regions, the electronic device 2000 may reconstruct each of the plurality of missing regions according to embodiments of the disclosure described below. In this case, the electronic device 2000 may individually reconstruct the plurality of missing regions whenever each of the plurality of missing regions is determined or may reconstruct the plurality of missing regions at once after the plurality of missing regions are determined.

In an embodiment of the disclosure, the electronic device 2000 may determine whether to extract a structural feature of the input image 306, based on a ratio of a size of the missing region 307 to a total size of all regions of the input image 306. When there are a plurality of missing regions, the electronic device 2000 may identify each of the plurality of missing regions and determine whether to extract a structural feature of the input image 306, as will be described in more detail with reference to FIGS. 11 and 12 below.

Figure 4:
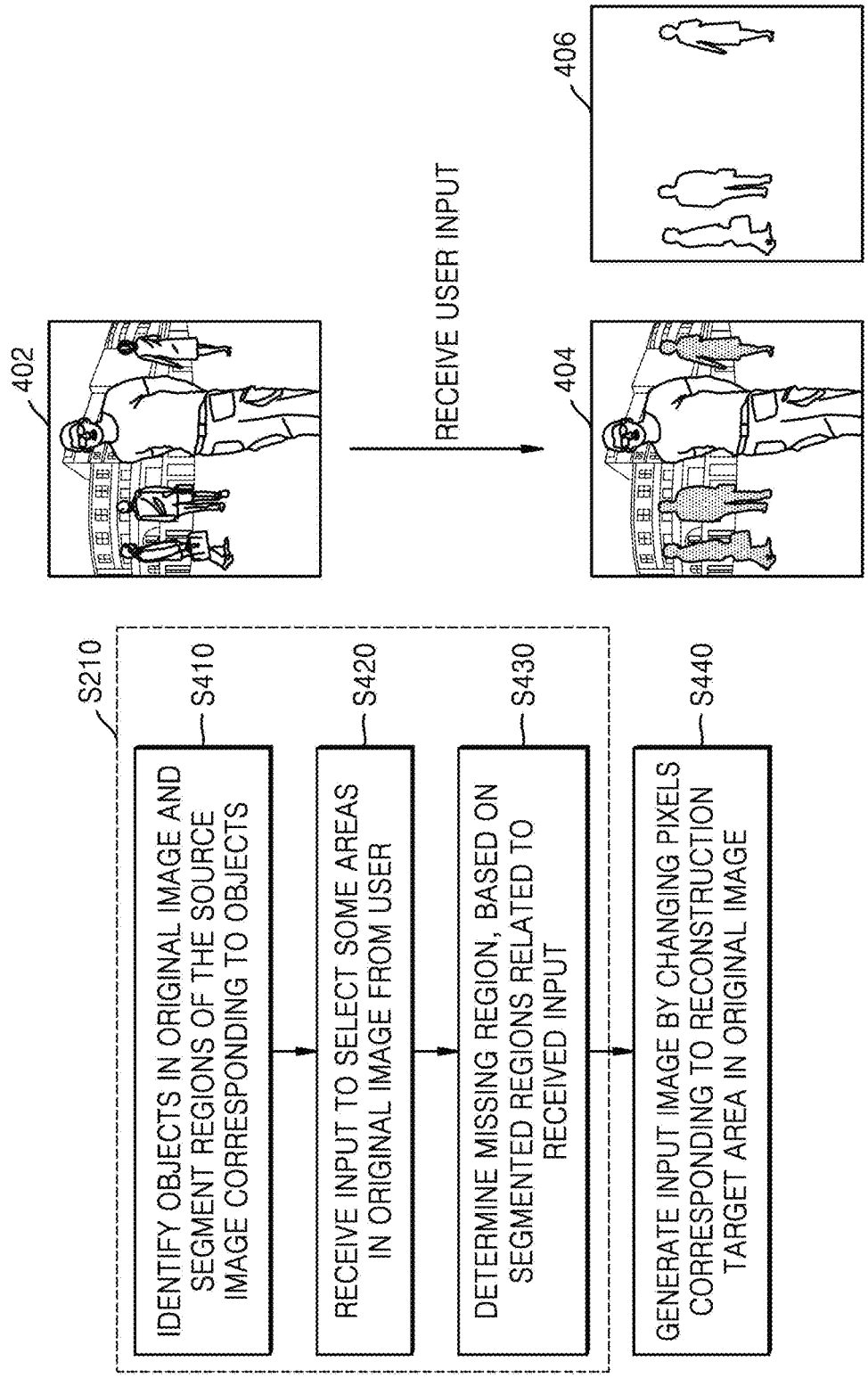
FIG. 4 is a diagram for describing a method of determining, by an electronic device, a missing region in an original image according to an embodiment of the disclosure.

FIG. 4 is a diagram for describing a method of determining, by an electronic device, a missing region in an original image according to an embodiment of the disclosure.

Referring to FIG. 4, operations S410 to S430 may correspond to operation S210 of FIG. 2, and operation S440 may correspond to operation S220 of FIG. 2.

In operation S410, the electronic device 2000 according to an embodiment of the disclosure may identifies objects in an original image and segment regions of the original image corresponding to the objects. In this case, the electronic device 2000 may use a neural network model for detecting objects in an image, based on an input image.

For example, the electronic device 2000 may receive an original image 402 and detect identifiable objects included in the original image 402 by using the neural network model. The electronic device 2000 may segment regions corresponding to the identified objects.

In operation S420, the electronic device 2000 according to an embodiment of the disclosure may receive an input to select some regions in the original image 402 from a user.

In an embodiment of the disclosure, the electronic device 2000 may display the segmented regions and receive a user input to select at least some of the segmented regions.

In an embodiment of the disclosure, the electronic device 2000 may receive a user input to select some regions in the original image 402 and match segmented regions corresponding to the selected regions.

In operation S430, the electronic device 2000 according to an embodiment of the disclosure may determine a missing region, based on the segmented regions related to the received input.

In an embodiment of the disclosure, the electronic device 2000 may display the segmented regions in the original image 402 through object identification, and determine a missing region, based on a user input to select at least some of the segmented regions. For example, the electronic device 2000 may display all objects, e.g., people located in a foreground region of the original image 402 and people located in a background region of the original image 402, that are identified in the original image 402 to guide a user to select the objects. When the user selects the people located in the background region from among the objects in the original image 402, the electronic device 2000 may determine segmented regions corresponding to the people located in the background region as a missing region.

In an embodiment of the disclosure, the electronic device 2000 may receive a user input to select some regions in the original image 402 and match segmented regions corresponding to the selected regions. The electronic device 2000 may determine the matched segmented regions as a missing region.

In operation S440, the electronic device 2000 according to an embodiment of the disclosure may generate an input image to be reconstructed by changing pixels corresponding to the missing region, based on the missing region.

In an embodiment of the disclosure, the electronic device 2000 may change pixel value of pixels corresponding to a missing region. For example, the electronic device 2000 may calculate an average value of pixel values of pixels of all images included in training data. The electronic device 2000 may obtain an input image 404, which is to be reconstructed, by changing the pixel values of the pixels corresponding to the missing region to the average value of the pixel values of the pixels of all the image in the training data. As another example, the electronic device 2000 may obtain the input image 404 by changing the pixel value of the pixels corresponding to the missing region to 0.

In addition, the electronic device 2000 may obtain a mask image 406 indicating the missing region. In this case, the mask image 406 may include the missing region and a non-missing region. The mask image may include masking information masking the missing region.

A plurality of missing regions may be determined from the original image 402. When there are a plurality of missing regions, the electronic device 2000 may reconstruct each of the plurality of missing regions according to embodiments of the disclosure described below. In this case, the electronic device 2000 may individually reconstruct the plurality of missing regions whenever each of the plurality of missing regions is determined or may reconstruct the plurality of missing regions at once after the plurality of missing regions are determined.

Figure 5:
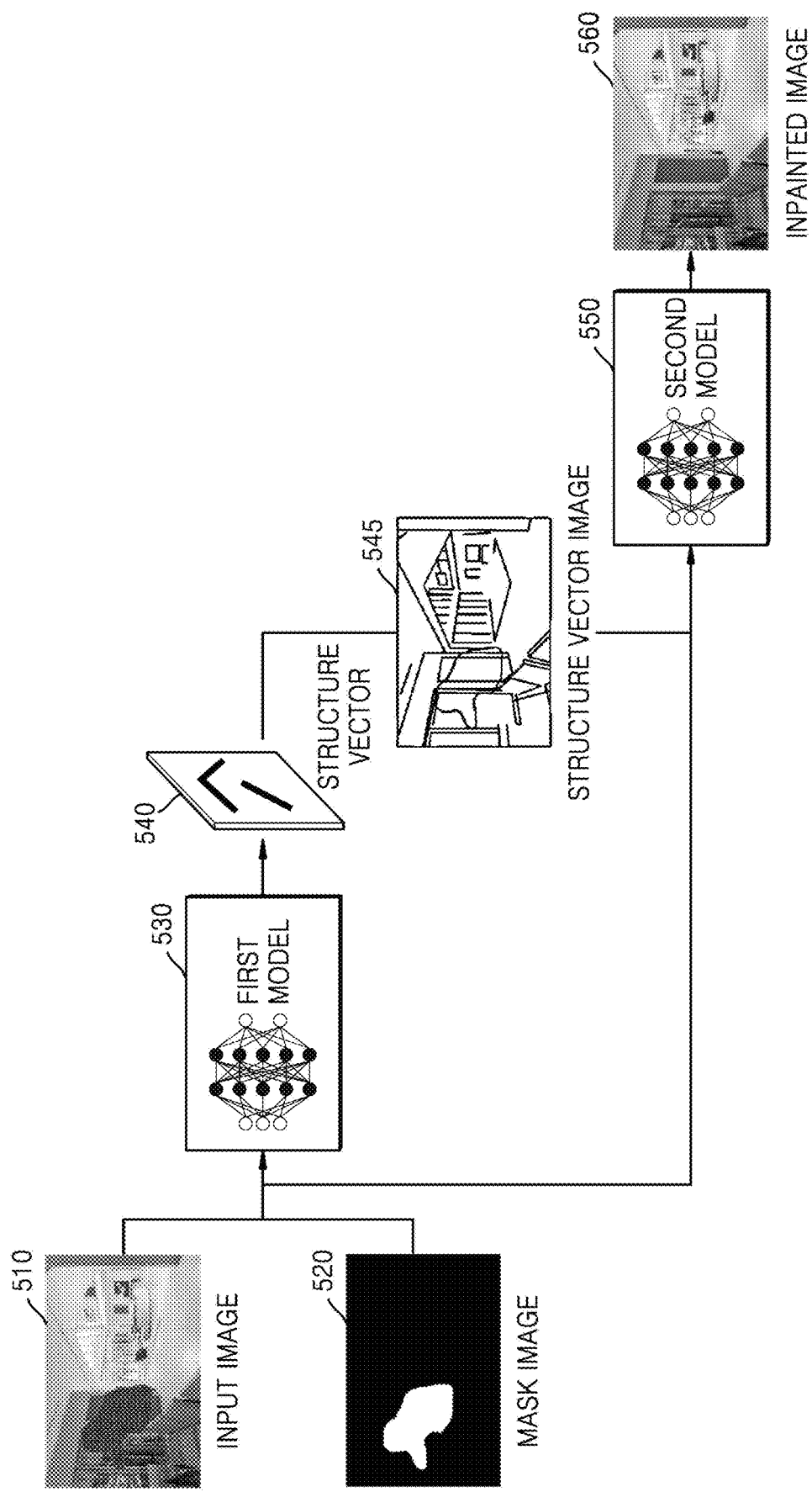
FIG. 5 is a diagram for describing a first model and a second model used by an electronic device to obtain an inpainted image, according to an embodiment of the disclosure.

FIG. 5 is a diagram for describing a first model and a second model used by an electronic device to obtain an inpainted image, according to an embodiment of the disclosure.

Referring to FIG. 5, the electronic device 2000 according to an embodiment of the disclosure may obtain a structure vector 540 by extracting structural features of structures in an image by using an input image 510 to be reconstructed and a mask image 520 that are obtained according to the embodiments of the disclosure described above. The structure vector 540 may be data that is obtained by extracting structural features of structures in the image and that includes one or more lines and one or more junctions.

The electronic device 2000 may input the input image 510 and the mask image 520 to a first model 530, which is a neural network model, and obtain the structure vector 540 output from the first model 530. The first model 530 may be a neural network model trained to extract a structural feature of the input image 510. In addition, the first model 530 may extract a structural feature of a missing region in the input image 510. The structural feature of the missing region refers to the structure vector 540 generated by predicting a structural feature in a missing region in which a structural feature is canceled due to a change of pixel values of the input image 510.

The electronic device 2000 may input the input image 510, the mask image 520, and a structure vector image 545, which is obtained by converting the structure vector 540 output from the first model, to a second model 550, which is a neural network model, and obtain an inpainted image 560 by using the second model 550. The second model 550 may obtain an inpainted image by generating pixels to fill the missing region in the input image 510 and filling the missing region with the generated pixels. In this case, when the second model 550 generates the pixels to fill the missing region, the structure vector 540 of the missing region, which is the structural feature of the missing region, may be used.

Figure 6:
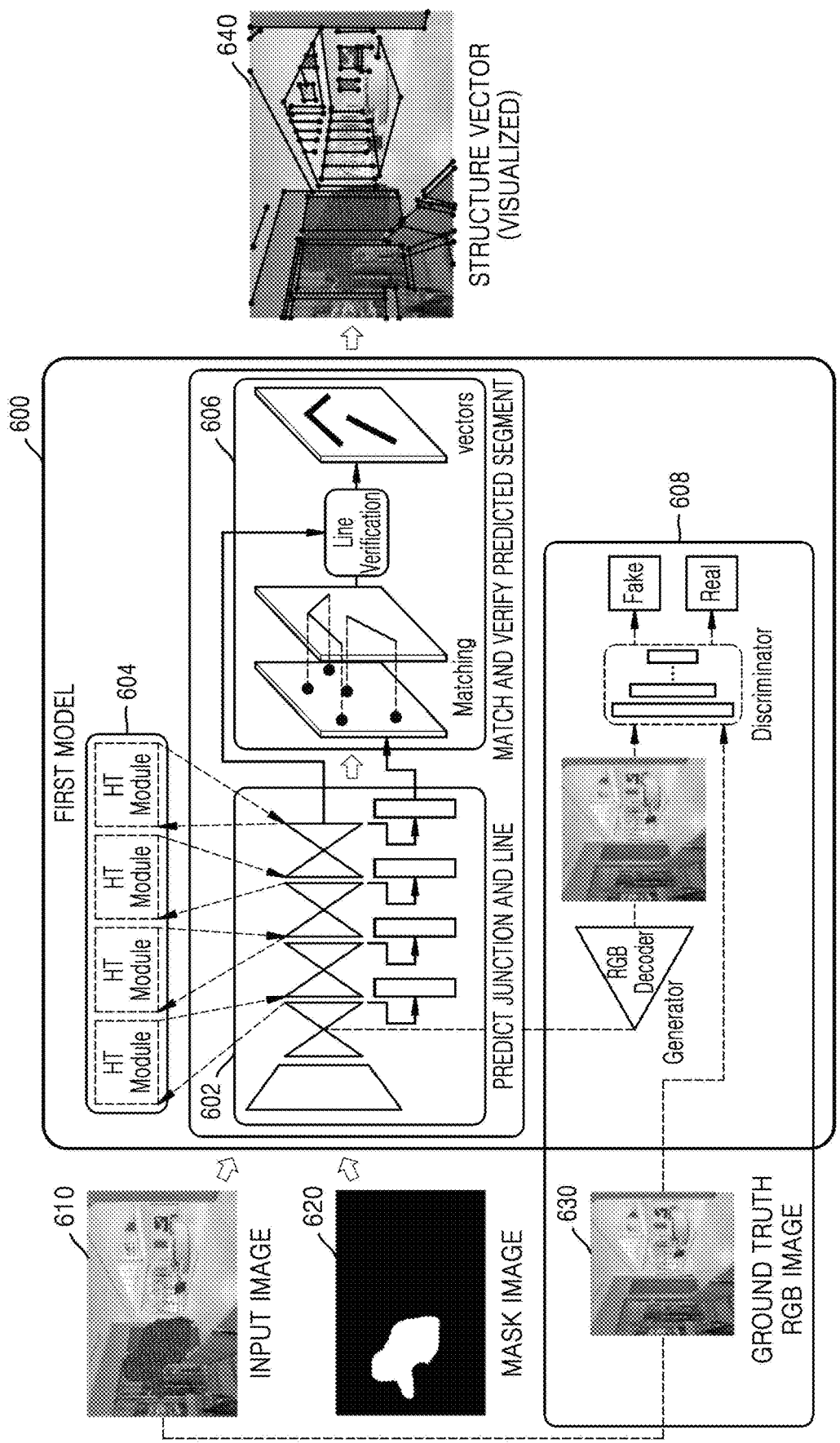
FIG. 6 is a diagram for describing an architecture of a first model for extracting a structural feature of an input image, according to an embodiment of the disclosure.

FIG. 6 is a diagram for describing an architecture of a first model for extracting a structural feature of an input image to be reconstructed, according to an embodiment of the disclosure.

Referring to FIG. 6, a first model 600 may receive an input image 610 to be reconstructed and a mask image 620 and output a structure vector 640.

The first model 600 may include a structure vector element extracting unit 602, a Hough transform unit 604, a structure vector verification unit 606, and a GAN 608. The first model 600 may be a model trained based on training data generated through a series of data processing processes. A method of training a first model by the electronic device 2000 will be described with reference to FIGS. 13 to 18 below.

The structure vector element extracting unit 602 may include a plurality of neural network layers. The structure vector element extracting unit 602 may receive the input image 610 and the mask image 620 and extract structure vector elements in the input image 610. Here, the input image 610 includes a missing region, and the mask image 620 refers to an image masking the missing region. The structure vector element extracting unit 602 may extract features from input images and obtain a plurality of image maps indicating junctions at which lines forming structures in an image meet and line segments which are candidates of lines forming the structures in the image. The obtained image maps may be each one-to-one converted into a junction coordinate element and a line segment coordinate element and a result of the converting is transmitted to the structure vector verification unit 606.

The Hough transform unit 604 may include a plurality of Hough transform modules and each of the Hough transform modules may include a plurality of neural network layers. Each of the Hough transform modules may receive a feature of an image and extracts linear features. Each of the Hough transform modules may extract linear features from the received feature of the image, combine the extracted linear features with the received feature of the image, and transmit a result of the combining to a neural network layer included in the structure vector element extracting unit 602. The Hough transform unit 604 may transmit linear features extracted from an input image to the structure vector verification unit 606.

Training of the Hough transform unit 605 during training of the first model 600 will be described in more detail with reference to FIG. 13 below.

The structure vector verification unit 606 may match a junction and line segments output from the structure vector element extracting unit 602 and verify a matched line using a linear feature outputted from the Hough transform unit 604. The structure vector verification unit 606 may output verified structure vectors as the structure vector 640 indicating structural features in the input image 610. In this case, the structure vector 640 may indicate the structural features in the input image 610, and may include a structure vector of a missing region of the input image 610, in which pixel values of some regions are changed.

The GAN 608 may include a generator model for outputting an RGB image generated from the input image 610, and a discriminator model for receiving either the RGB image generated from the input image 610 or a ground truth RGB image 630 and judging the authenticity of the received image. The discriminator model of the GAN 608 may be trained to discriminate the authenticity of an RGB image input thereto during the training of the first model 600. Specifically, the discriminator model may be trained to classify the input RGB image as a "real" class when it is determined that the input RGB image is a ground truth RGB image 630 that is a raw image, and classify the input RGB image as a "fake" class when it is determined that the input RGB image is an RGB image generated by processing an input image to be reconstructed, which is generated by the generator model. In addition, the generator model of the GAN 608 may be trained to generate images close to ground truth during the training of the first model 600.

Training of the GAN 608 during the training of the first model 600 will be described in more detail with reference to FIG. 14 below.

Figure 7:
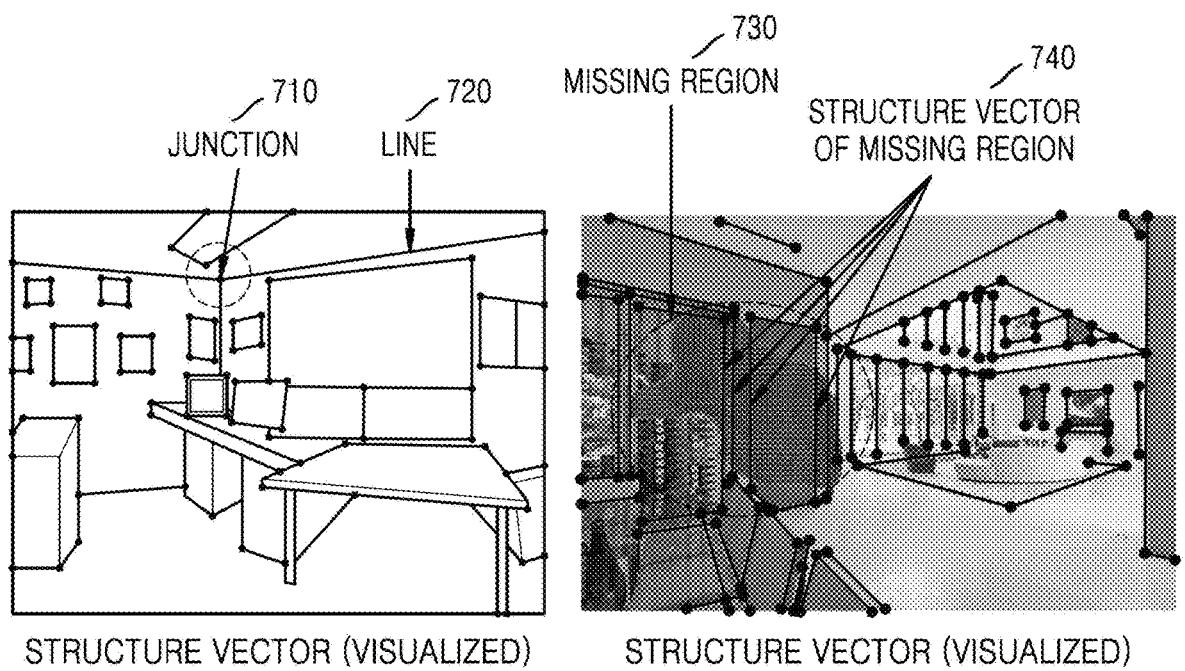
FIG. 7 is a diagram for describing a structure vector obtained using a first model by an electronic device, according to an embodiment of the disclosure.

FIG. 7 is a diagram for describing a structure vector obtained using a first model by an electronic device, according to an embodiment of the disclosure.

Referring to FIG. 7, structure vectors obtained using the first model may include a junction 710 and a line 720.

In an embodiment of the disclosure, the structure vectors obtained using the first model and including the junction 710 and the line 720 may include a structure vector 740 of a missing region in an input image to be reconstructed. Here, the missing region refers to a region of the input image, the visual meaning of which is not identifiable due to a change of pixel values corresponding to the region.

The electronic device 2000 may use the first model to obtain the structure vector 740 of the missing region regardless of whether there is a missing region 730 of the input image and a size of the missing region. The first model may obtain the structure vector 740 of the missing region by receiving the input image and a mask image and inferring a structural feature of a structure expected to be in the missing region. The structure vector 740 of the missing region may be used to guide a frame structure of a structure corresponding to the missing region when the electronic device 2000 inserts pixels into the missing region thereby inpainting the input image. The electronic device 2000 may convert the structure vectors obtained using the first model into the form of an image to obtain a structure vector image.

The electronic device 2000 may obtain an inpainted image, in which the missing region in the input image is reconstructed, by applying the input image, the mask image, and the structure vector image to the second model.

Figure 8:
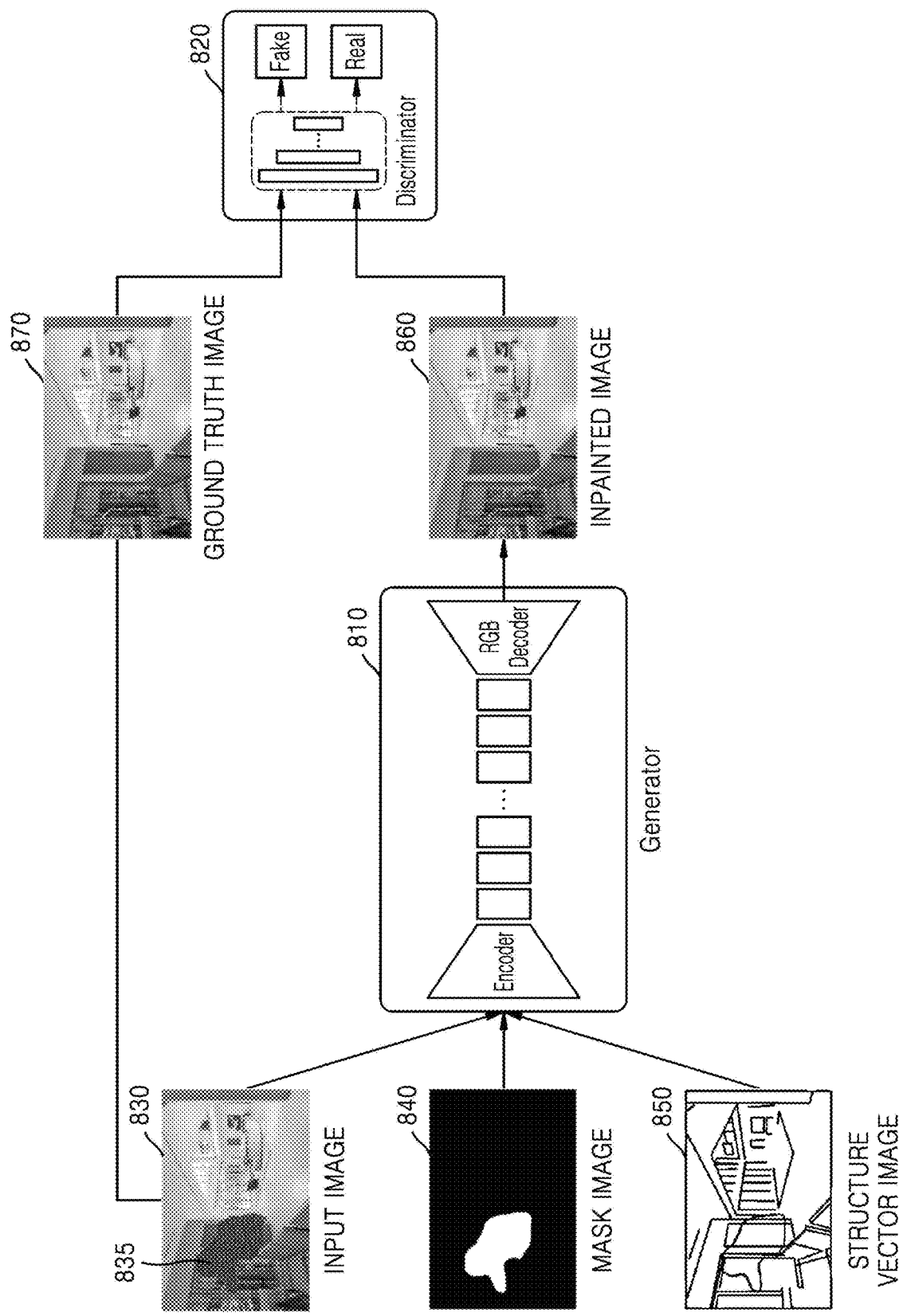
FIG. 8 is a diagram for describing an architecture of a second model for outputting an inpainted image, according to an embodiment of the disclosure.

FIG. 8 is a diagram for describing an architecture of a second model for outputting an inpainted image, according to an embodiment of the disclosure.

Referring to FIG. 8, the second model may be a GAN, which is a neural network model including a generator model 810 and a discriminator model 820. The second model may use the generator model 810 to receive an input image 830 to be reconstructed, a mask image 840, and a structure vector image 850 obtained by converting a structure vector received from a first model and to output an inpainted image 860 in which a missing region 835 of the input image 830 is reconstructed.

The generator model 810 may reconstruct the missing region 835, based on a region of the structure vector image 850 corresponding to the missing region 835 of the input image 830. Specifically, the generator model 810 may generate the inpainted image 860 by generating pixels corresponding to the missing region 835 of the input image 830 by using an RGB decoder and filling the missing region 835 with the pixels.

The electronic device 2000 may train the second model. In addition, the electronic device 2000 may obtain a trained second model from another electronic device (e.g., the server 3000).

During the training of the second model, the generator model 810 of the second model may be trained to generate images having the same features as a ground truth image 870. In addition, during the training of the second model, the discriminator model 820 of the second model may be trained to discriminate the authenticity of an image input to the discriminator model 820. Specifically, the discriminator model 820 may be trained to classify an input image as a "real" class when it is determined that the input image is the ground truth image 870 that is a raw image, and classify the input image as a "fake" class when it is determined that the input image is the inpainted image 860 generated by reconstructing the input image by the generator model.

The training of the second model will be described in more detail with reference to FIG. 19 below.

Figure 9:
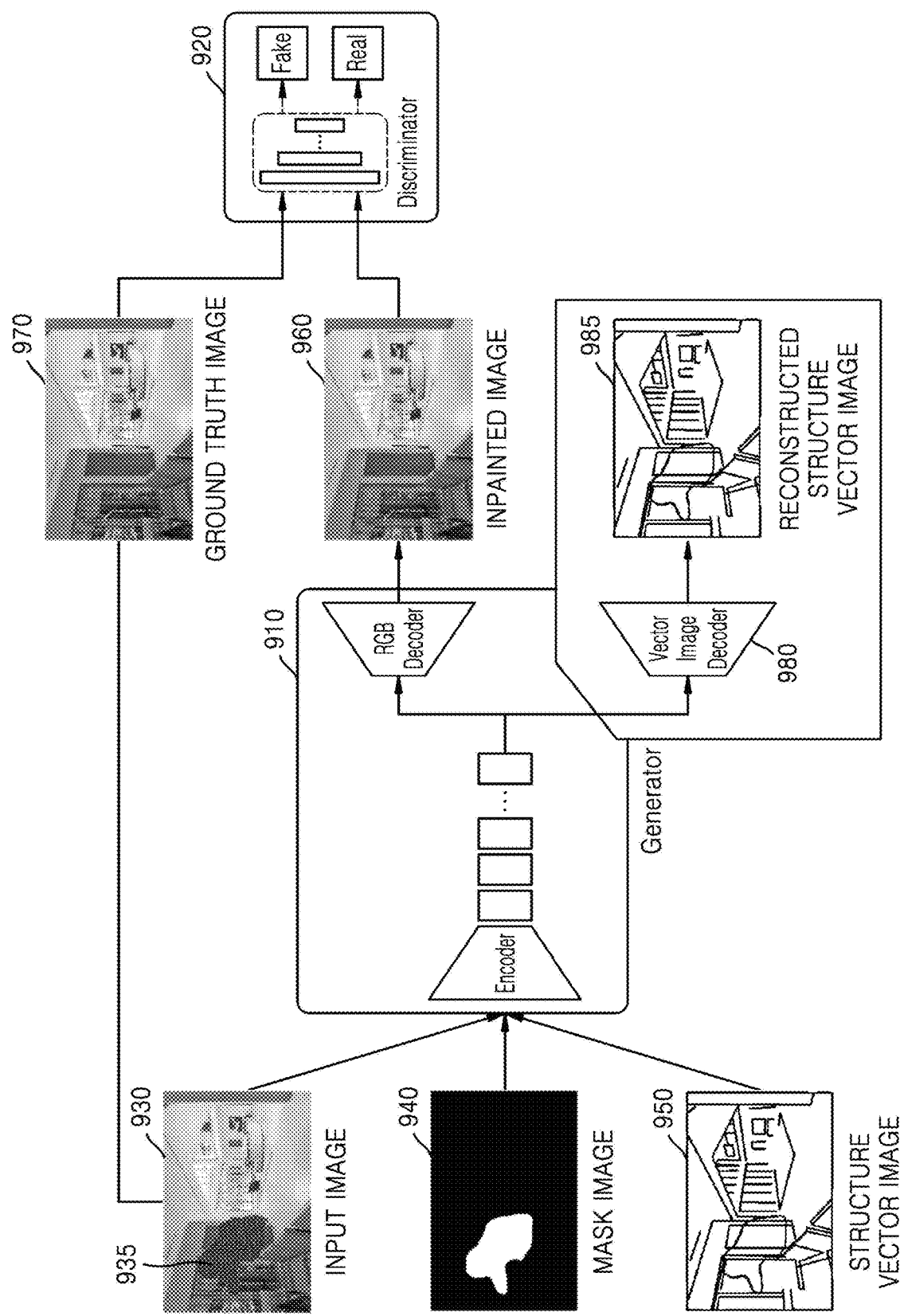
FIG. 9 is a diagram for describing another architecture of a second model for outputting an inpainted image, according to an embodiment of the disclosure.

FIG. 9 is a diagram for describing another architecture of a second model for outputting an inpainted image, according to an embodiment of the disclosure.

The second model may be a GAN, which is a neural network model including a generator model 910 and a discriminator model 920. The second model use the generator model 910 to receive an input image 930 to be reconstructed, a mask image 940, and a structure vector image 950 and output an inpainted image 960 in which a missing region 935 of the input image 930 is reconstructed.

During the training of the second model, the generator model 910 of the second model may be trained to generate images having the same features as a ground truth image 970. In addition, during the training of the second model, the discriminator model 920 of the second model may be trained to discriminate the authenticity of an image input to the discriminator model 920. In describing FIG. 9, a description a configuration corresponding to FIG. 8 will be omitted herein.

Referring to FIG. 9, the second model according to an embodiment of the disclosure may further include a vector image decoder 980. The vector image decoder 980 may share neural network layers included in the generator model 910. The vector image decoder 980 may output a reconstructed structure vector image 985 which is a result of reproducing the structure vector image 950 input to the generator model 910, based on feature values output from the neural network layers included in the generator model 910. The vector image decoder 980 included in the second model may allow the reconstructed structure vector image 985 to be generated based on the feature values output from the neural network layers included in the generator model 910, so that a feature of a structure vector image extracted from a structural feature of an input image to be reconstructed may be retained in the generator model 910.

The electronic device 2000 may train the second model. In addition, the electronic device 2000 may obtain a trained second model from another electronic device (e.g., the server 3000). During the training of the second model, the vector image decoder 980 included in the second model may be trained to generate the reconstructed structure vector image 985 having the same feature as the input structure vector image 950.

Figure 10:
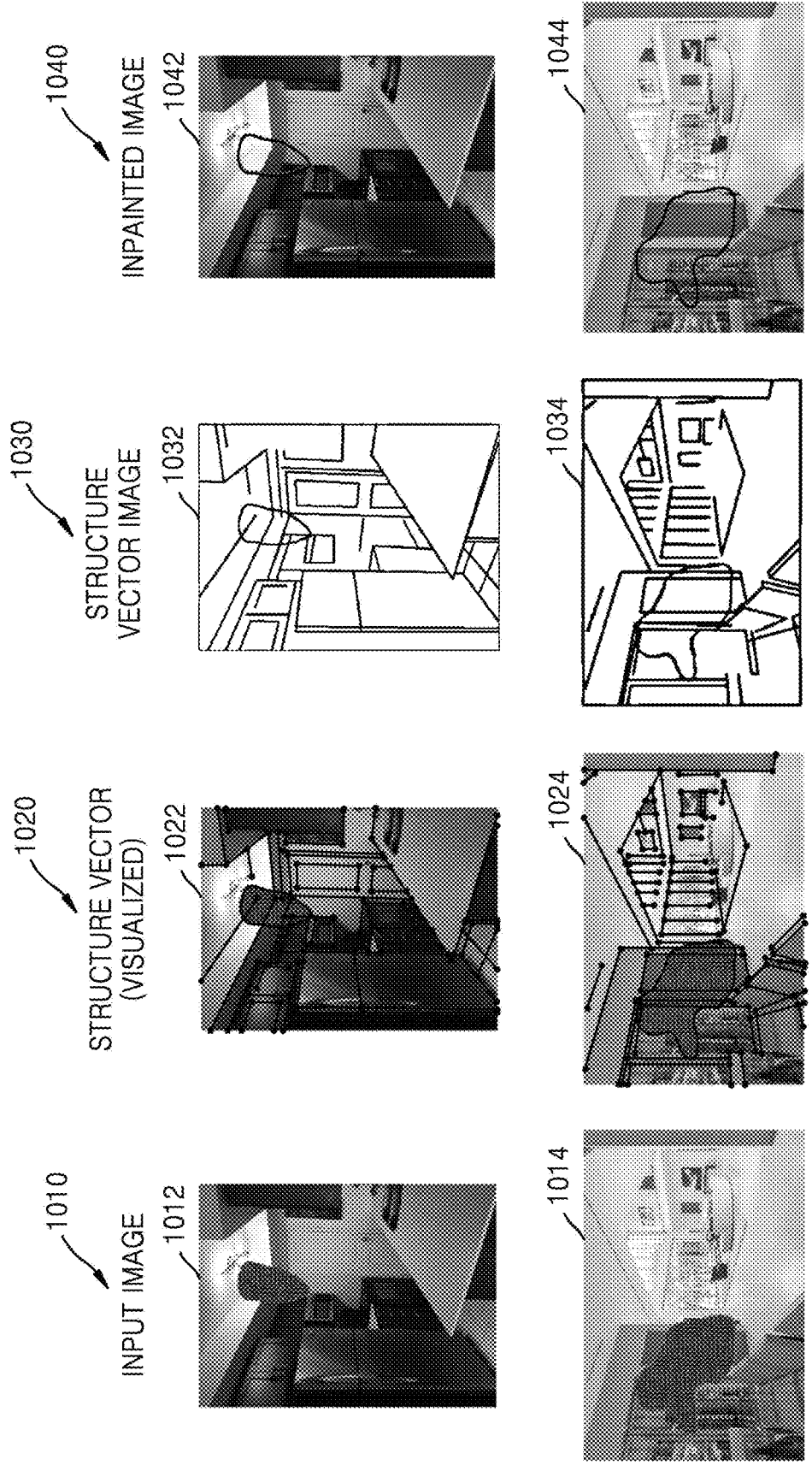
FIG. 10 is a diagram for describing an inpainted image obtained using a second model by an electronic device, according to an embodiment of the disclosure.

FIG. 10 is a diagram for describing an inpainted image obtained using a second model by an electronic device, according to an embodiment of the disclosure.

In an embodiment of the disclosure, the electronic device 2000 may generate an input image 1010 to be reconstructed according to the above-described embodiments of the disclosure. A missing region in the input image 1010 may be determined according to the above-described embodiments of the disclosure and may vary according to the input image 1010. Referring to FIG. 10, a missing region in a first input image 1012 to be reconstructed may be smaller than a missing region in a second input image 1014 to be reconstructed.

The electronic device 2000 may obtain a structure vector 1020 by inputting the input image 1010 and a mask image indicating a missing region to a first model and extracting a structural feature of the input image 1010.

The electronic device 2000 may obtain the structure vector 1020 by extracting the structural feature of the input image 1010 regardless of whether the missing region in the input image 1010 is large or not. In this case, the structure vector 1020 may include a structure vector of the missing region indicating a structural feature of the missing region.

For example, there may be no visually meaningful pixels in the missing region in the first input image 1012 but the first model may infer a structural feature of the missing region in the first input image 1012 so as to obtain a first structure vector 1022, including a structure vector of the missing region of the first input image 1012.

For example, there may be no visually meaningful pixels in the missing region in the second input image 1014 but the first model may infer a structural feature of the missing region in the second input image 1014 so as to obtain a second structure vector 1024, including a structure vector of the missing region in the second input image 1014.

The electronic device 2000 may input the input image 1010, a mask image indicating the missing region, and a structure vector image 1030 converted from the structure vector 1020 to the second model, and obtain an inpainted image 1040 in which the missing region in the input image 1010 is reconstructed.

For example, the electronic device 2000 may use the second model to obtain a first inpainted image 1042, in which the missing region in the first input image 1012 is guided by a structure vector image 1032 of a first structure vector to be reconstructed.

For example, the electronic device 2000 may use the second model to obtain a second inpainted image 1044, in which the missing region in the second input image 1014 is guided by a structure vector image 1034 of a second structure vector to be reconstructed.

In an embodiment of the disclosure, the electronic device 2000 may obtain the inpainted image 1040 in which the missing region is naturally reconstructed to match context of the input image 1010 regardless of a size of the missing region in the input image 1010 by using the first model to extract the structural feature of the input image 1010 and the second model to reconstruct the input image 1010 by using the structure vector image of the structure vector 1020. That is, the electronic device 2000 may obtain the structure vector 1020 of the missing region in the input image 1010 and thus may perform robust inpainting image processing without being influenced by the size of the missing region when the missing region is reconstructed and without causing blurring or distortion of a reconstructed region.

Figure 11:
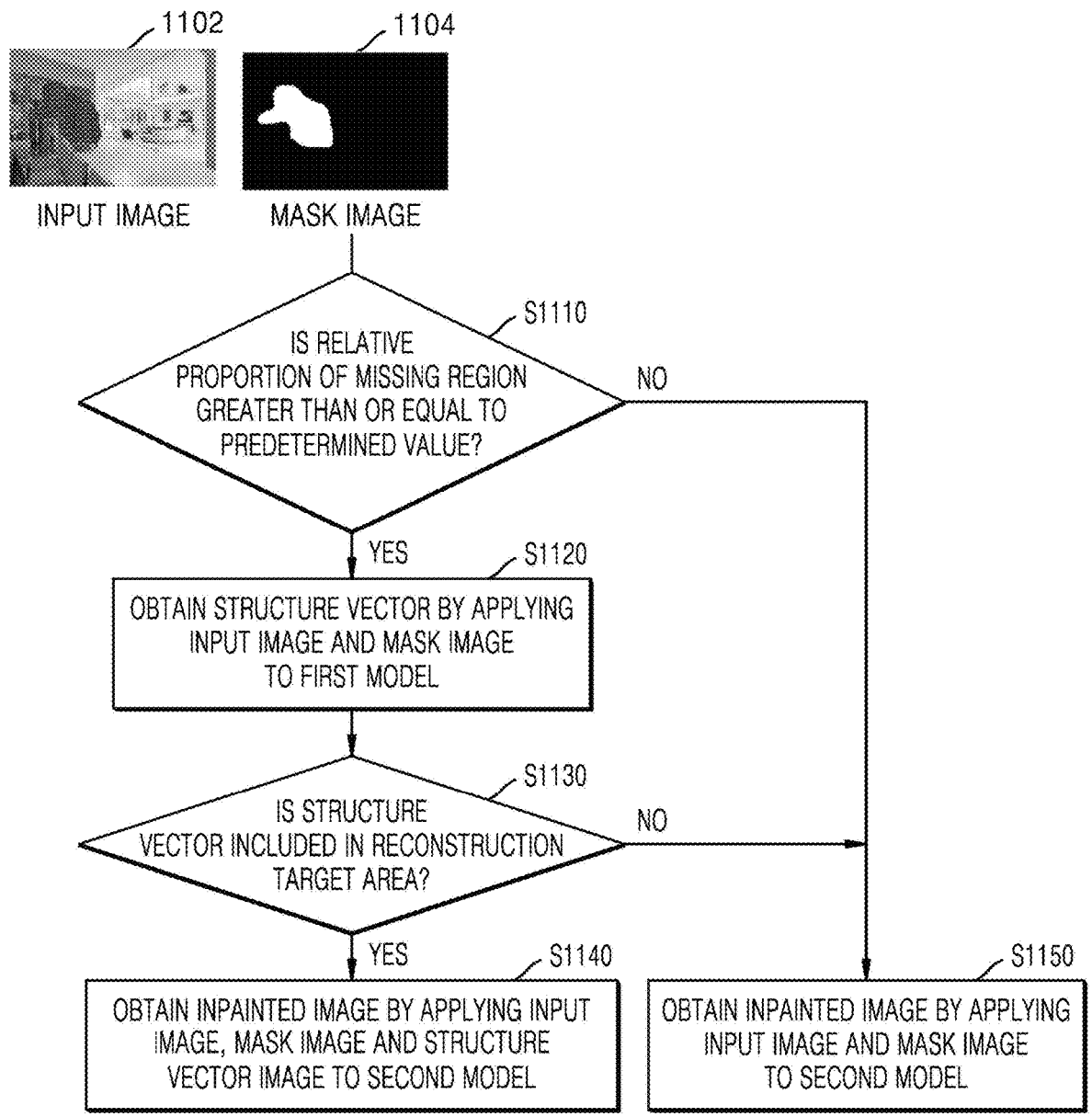
FIG. 11 is a flowchart of a method of obtaining an inpainted image by an electronic device, according to an embodiment of the disclosure.

FIG. 11 is a flowchart of a method of obtaining an inpainted image by an electronic device, according to an embodiment of the disclosure.

Referring to FIG. 11, the electronic device 2000 may determine whether to perform operation S1110, based on an attribute of a missing region, before performing operation S1110. For example, when a determined missing region is determined from the original image 304 of FIG. 3 in which some regions are damaged, a structural feature of the missing region may not be needed to be extracted. The electronic device 2000 may determine whether to perform operation S1110, based on a width of the missing region. For example, the electronic device 2000 may perform operation S1110 when a maximum width of the missing region is greater than or equal to a predetermined value. The electronic device 2000 may perform operation S1150 when the maximum width of the missing region is less than the predetermined value. When there are a plurality of missing regions, the electronic device 2000 may perform operation S1110 when a width (e.g., a maximum width) of at least one of the plurality of missing regions is greater than or equal to a predetermined value, and perform operation S1150 when a width (e.g., a maximum width) of each of the plurality of missing regions is less than the predetermined value. A method of determining a width of a missing region by the electronic device 2000 has been described above with respect to operation S240 of FIG. 2 and thus a description thereof is omitted here.

In operation S1110, the electronic device 2000 according to an embodiment of the disclosure may determine whether a relative proportion of the missing region is greater than or equal to a predetermined value. Here, the relative proportion of the missing region refers to a relative proportion of the missing region in an input image 1102 to be reconstructed. For example, the electronic device 2000 may determine to extract a structural feature of the missing region when a ratio of the number of pixels of the missing region to the number of pixels of the input image is greater than or equal to a predetermined value. The electronic device 2000 may perform operation S1120 to extract a structural feature of the missing region when the relative proportion of the missing region is greater than or equal to the predetermined value. The electronic device 2000 may perform operation S1150 without extracting the structural feature of the missing region when the relative proportion of the missing region is less than the predetermined value.

In performing operation S1110 by the electronic device 2000, a plurality of missing regions may be provided. In this case, the electronic device 2000 may individually reconstruct the plurality of missing regions whenever each of the plurality of missing regions is determined or may reconstruct the plurality of missing regions at once after the plurality of missing regions are determined.

The electronic device 2000 may identify each of the missing regions forming an isolated simple closed curve, based on whether pixels of the missing regions are connected.

When the electronic device 2000 individually reconstructs missing regions whenever each of the missing regions is determined, the electronic device 2000 may operate in the same manner as when there is only one missing region. The operation of the electronic device 2000 when there is only one missing region has been described above and thus a description thereof is omitted here.

When the electronic device 2000 reconstructs the plurality of missing regions at once, the electronic device 2000 may determine whether a relative proportion of each of the plurality of missing regions is greater than or equal to a predetermined value. The electronic device 2000 may perform operation S1120 to extract structural features of the plurality of missing regions at once when the relative proportion of each of one or more missing regions among the plurality of missing regions is greater than or equal to the predetermined value. The electronic device 2000 may perform operation S1150 without extracting the structural features of the missing regions when all of the relative proportions of the plurality of missing regions are less than the predetermined value.

In operation S1120, the electronic device 2000 according to an embodiment of the disclosure may obtain a structure vector indicating a structural feature of structures in the input image 1102 by applying the input image 1102 and a mask image 1104 to a first model. The structure vector may include one or more lines and one or more junctions. A method of obtaining a structure vector by using the first model by the electronic device 2000 has been described in the above-described embodiments of the disclosure and thus a redundant description is omitted.

In operation S1130, the electronic device 2000 according to an embodiment of the disclosure may identify whether the structure vector is included in the missing region. When the structure vector is included in the missing region, the structure vector in the missing region may be used to reconstruct the missing region. The electronic device 2000 may perform operation S1140 when the structure vector is included in the missing region. The electronic device 2000 may perform operation S1150 when the structure vector is not included in the missing region.

In operation S1140, the electronic device 2000 according to an embodiment of the disclosure may obtain an inpainted image by applying the input image 1102, the mask image 1104, and a structure vector image to a second model. A method of obtaining an inpainted image by using the second model by the electronic device 2000 has been described in the above-described embodiments of the disclosure and thus a redundant description is omitted.

In operation S1150, the electronic device 2000 according to an embodiment of the disclosure may obtain an inpainted image by applying the input image 1102 and the mask image 1104 to the second model. In this case, the second model may receive only the input image 1102 and the mask image 1104 and output an inpainted image. Alternatively, the second model may receive data to be used when the input image 1102, the mask image 1104, and the structure vector are not used, and output an inpainted image.

Figure 12:
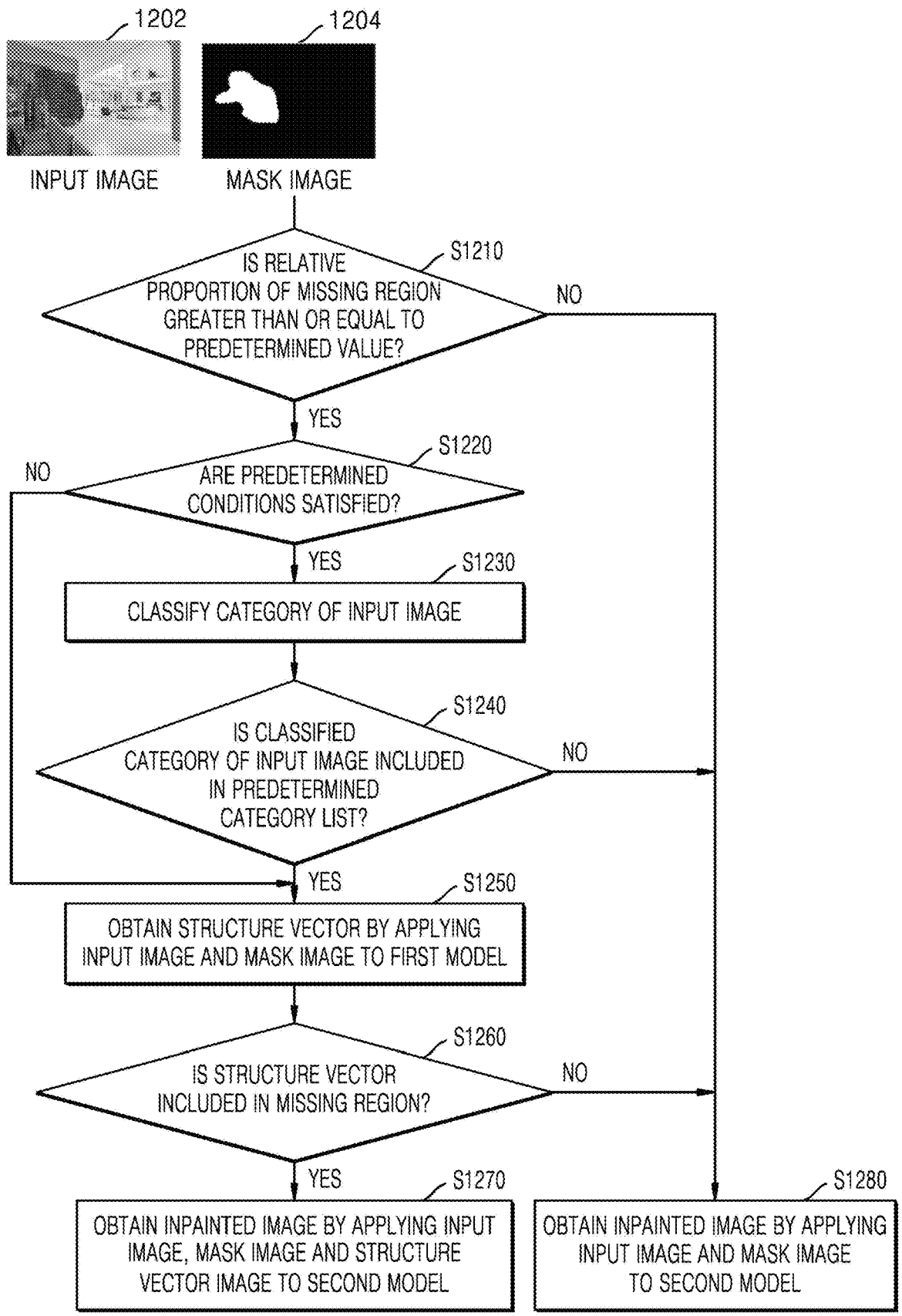
FIG. 12 is a flowchart of another method of obtaining an inpainted image by an electronic device, according to an embodiment of the disclosure.

FIG. 12 is a flowchart of another method of obtaining an inpainted image by an electronic device, according to an embodiment of the disclosure.

Referring to FIG. 12, the electronic device 2000 may determine whether to perform operation S1210, based on an attribute of a missing region, before performing operation S1210. For example, when the missing region is determined from the original image 304 of FIG. 3 in which some regions are damaged, a structural feature of the missing region may not be needed to be extracted. The electronic device 2000 may determine whether to perform operation S1210, based on the width of the missing region. For example, the electronic device 2000 may perform operation S1210 when a maximum width of the missing region is greater than or equal to a predetermined value. The electronic device 2000 may perform operation S1280 when the maximum width of the missing region is less than the predetermined value. When there are a plurality of missing regions, the electronic device 2000 may perform operation S1210 when a width (e.g., a maximum width) of at least one of the plurality of missing regions is greater than or equal to a predetermined value, and perform operation S1280 when a width (e.g., a maximum width) of each of the plurality of missing regions is less than the predetermined value. A method of determining a width of a missing region by the electronic device 2000 has been described above with respect to operation S240 of FIG. 2 and thus a description thereof is omitted here.

In operation S1210, the electronic device 2000 according to an embodiment of the disclosure may determine whether a relative proportion of the missing region is greater than or equal to a predetermined value. Operation S1210 corresponds to operation S1110 of FIG. 11 and thus a redundant description will be omitted. When there are a plurality of missing regions, the electronic device 2000 may determine whether a relative proportion of each of the plurality of missing regions is greater than or equal to a predetermined value whenever each of the plurality of missing regions is determined. When the electronic device 2000 reconstructs the plurality of missing regions at once, the electronic device 2000 may determine whether a relative proportion of each of the plurality of missing regions is greater than or equal to a predetermined value. The electronic device 2000 may perform operation S1220 to identify whether a structural feature of the plurality of missing regions satisfies other conditions, when the relative proportion of one or more missing regions among the plurality of missing regions is greater than or equal to the predetermined value. The electronic device 2000 may perform operation S1280 without extracting the structural features of the missing regions when all of the relative proportions of the plurality of missing regions are less than the predetermined value.

In operation S1220, the electronic device 2000 according to an embodiment of the disclosure may identify whether predetermined conditions for the electronic device 2000 to perform operations S1230 and S1240 are satisfied.

In an embodiment of the disclosure, the preset conditions may include whether a relative proportion of a missing region is greater than or equal to a threshold value. The electronic device 2000 may perform operation S1230 when the relative proportion of the missing region is greater than or equal to the threshold value. For example, the predetermined value, which is a reference value in operation S1120, may be 20%, and the threshold value included in the predetermined conditions may be 40%. When the relative proportion of the missing region is 30%, the relative proportion of the missing region is greater than the predetermined value, i.e., 20%, operation S1220 is performed but the electronic device 2000 may perform operation S1250 without performing operation S1230 because the relative proportion of the missing region is less than the threshold value, i.e., 40%. Alternatively, when the relative proportion of the missing region is 50%, the relative proportion of the missing region is greater than the threshold value, i.e., 40%, and thus, the electronic device 2000 may perform operation S1230. When there are a plurality of missing regions, the electronic device 2000 may perform operation S1230 when a relative proportion of one or more missing regions is greater than or equal to the threshold value.

The electronic device 2000 according to an embodiment of the disclosure may perform operation S1230 to classify a category of the input image 1202, in which a relative proportion of a missing region is greater than or equal to the threshold value, so that a structural feature of a reconstruction target object in which a relative proportion of a missing region is greater than the threshold value may be accurately and effectively obtained.

In an embodiment of the disclosure, the preset conditions may include whether a computing budget available for the electronic device 2000 is sufficient for the electronic device 2000 to perform operation S1230. The electronic device 2000 may identify the computing budget available therefor. The electronic device 2000 may determine whether to perform operation S1230, based on the identified computing budget. For example, the size of an image category classification model may be S0, the amount of memory usage may be M0, and a runtime may be T0 when operation S1230 is performed, the size of a first model may be S1, the amount of memory usage may be M1, and a runtime may be T1 when operation S1250 is performed, and the size of a second model may be S2, the amount of memory usage may be M2, and a runtime may be T2 when operation S1270 is performed. The electronic device 2000 may identify a read-only memory (ROM) free space limit, an available memory limit, and a desired runtime that are computing budgets of the electronic device 2000. The electronic device 2000 according to an embodiment of the disclosure may determine that an available computing budget of the electronic device 2000 is sufficient to perform operation S1230 when the ROM free space limit is greater than or equal to the sum of S0, S1 and S2, the available memory limit is greater than or equal to the sum of M0, M1 and M2, and the desired runtime limit is greater than or equal to the sum of T0, T1 and T2.

In operation S1230, the electronic device 2000 according to an embodiment of the disclosure may classify a category of the input image. For example, the electronic device 2000 may classify a scene category of the input image. The electronic device 2000 may classify a scene category of the input image 1202 by using an image category classification model.

In operation S1240, the electronic device 2000 according to an embodiment of the disclosure may identify whether the classified scene category of the input image 1202 is included in a predetermined category list. The electronic device 2000 may perform operation S1250 to extract a structural feature of the missing region when the scene category of the input image 1202 is included in the predetermined category list. The electronic device 2000 may perform operation S1280 when the scene category of the input image 1202 is not included in the predetermined category list.

The predetermined category list may include categories of scenes having structural features. For example, a scene category with a structural feature may be, but is not limited to, an airport terminal, an apartment building, a corridor, a bedroom, a hotel room, a cinema, a museum, etc.

In operation S1250, the electronic device 2000 according to an embodiment of the disclosure may obtain a structure vector indicating a structural feature of structures in the input image 1202 by applying the input image 1202 and a mask image 1104 to the first model. A method of obtaining a structure vector by using the first model by the electronic device 2000 has been described in the above-described embodiments of the disclosure and thus a redundant description is omitted.

In operation S1260, the electronic device 2000 according to an embodiment of the disclosure may identify whether the structure vector is included in the missing region. When the structure vector is included in the missing region, the structure vector in the missing region may be used to reconstruct the missing region. The electronic device 2000 may perform operation S1270 when the structure vector is included in the missing region. The electronic device 2000 may perform operation S1280 when the structure vector is not included in the missing region.

In operation S1270, the electronic device 2000 according to an embodiment of the disclosure may obtain an inpainted image by applying the input image 1202, the mask image 1204, and the structure vector to a second model. A method of obtaining an inpainted image by using the second model by the electronic device 2000 has been described in the above-described embodiments of the disclosure and thus a redundant description is omitted.

In operation S1280, the electronic device 2000 according to an embodiment of the disclosure may obtain an inpainted image by applying the input image 1202 and the mask image 1204 to the second model. In this case, the second model may receive only the input image 1202 and the mask image 1204 and output an inpainted image. Alternatively, the second model may receive data to be used when the input image 1202, the mask image 1204, and the structure vector are not used, and output an inpainted image.

Figure 13:
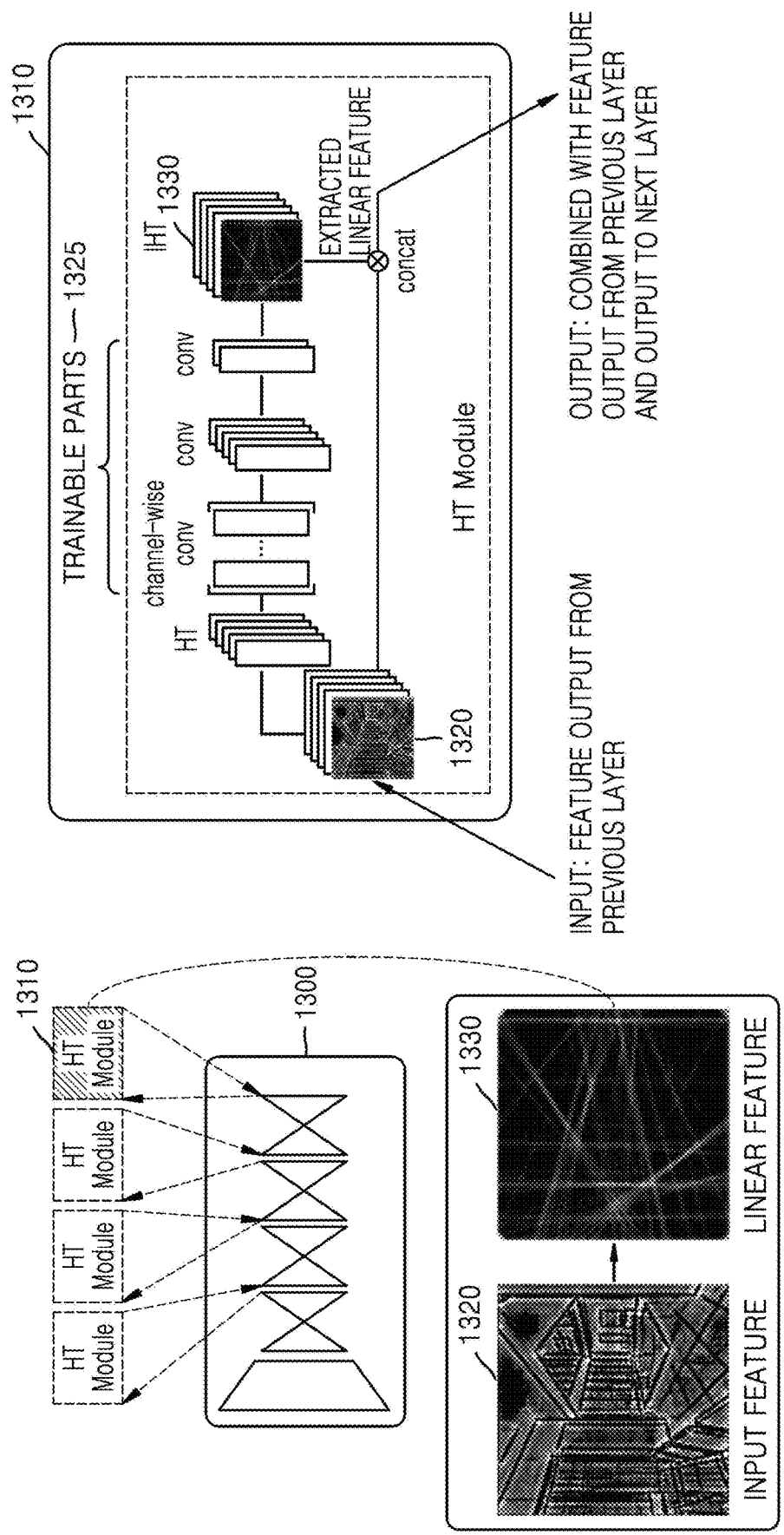
FIG. 13 is a diagram for describing training of a structure vector element extracting unit of a first model and a Hough transform unit when the first model is trained by an electronic device, according to an embodiment of the disclosure.

FIG. 13 is a diagram for describing training of a structure vector element extracting unit of a first model and a Hough transform unit when the first model is trained by an electronic device, according to an embodiment of the disclosure.

Referring to FIG. 13, a structure vector element extracting unit 1300 of the first model may receive an input image to be reconstructed and a mask image according to the above-described embodiments of the disclosure and extract structure vector elements in the input image.

The structure vector element extracting unit 1300 may include a plurality of neural network layers. In this case, with respect to the neural network layers of the structure vector element extracting unit 1300, a feature map output from a previous layer of the structure vector element extracting unit 1300 may be input to a Hough transform module 1310 and a linear feature map output from the Hough transform module 1310 may be input to a subsequent layer of the structure vector element extracting unit 1300.

For example, the Hough transform module 1310 may receive an input feature map 1320 output from the previous layer, perform a plurality of operations, including a convolution operation, and extract a linear feature 1330 from the input feature map 1320. In this case, weights of nodes included in layers corresponding to trainable parts 1325 may be updated as the first model is trained. The Hough transform module 1310 may combine the extracted linear feature 1330 with the input feature map 1320 and transmit the feature map 1320 combined with the linear feature 1330 to the subsequent neural network layer of the structure vector element extracting unit 1300.

Figure 14:
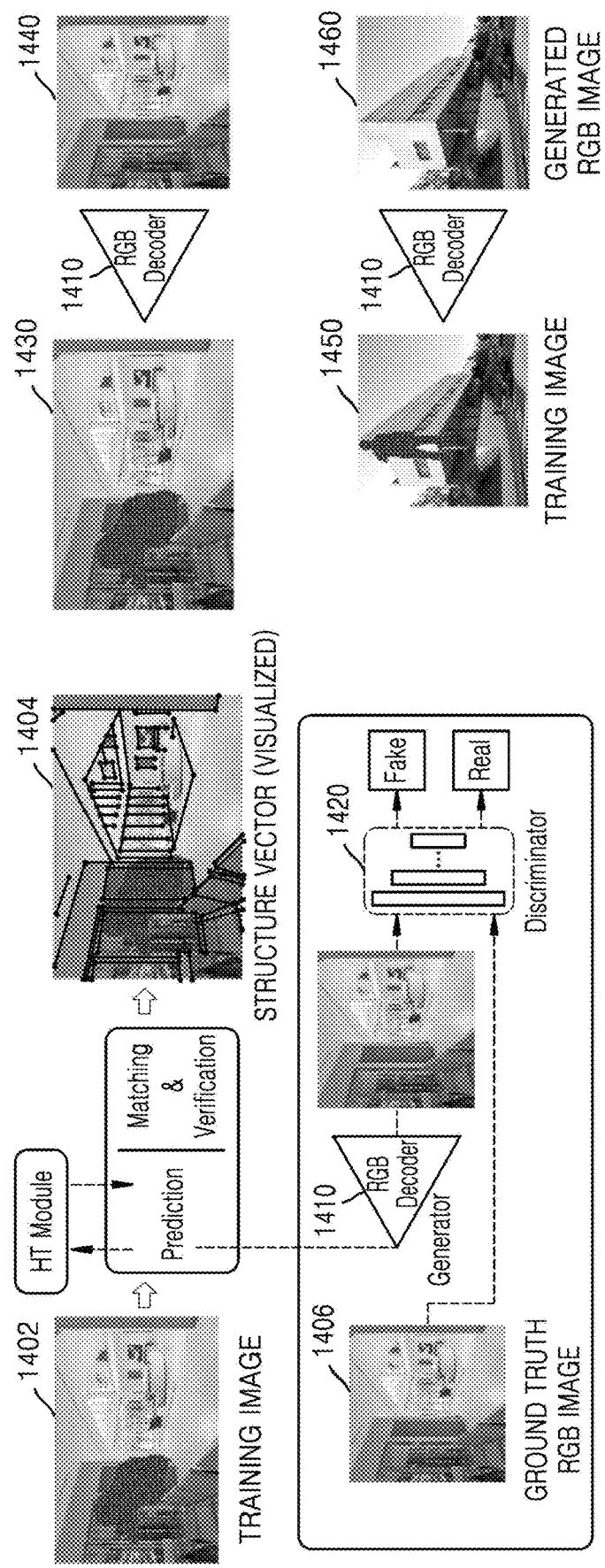
FIG. 14 is a diagram for describing a generative adversarial network (GAN) of a first model when the first model is trained by an electronic device, according to an embodiment of the disclosure.

FIG. 14 is a diagram for describing a GAN of a first model when the first model is trained by an electronic device, according to an embodiment of the disclosure.

Referring to FIG. 14, a first model for outputting a structure vector 1404 may include a GAN. The GAN may include a generator model 1410 and a discriminator model 1420. The generator model 1410 may receive a training image 1402 and output a generated RGB image 1440 and 1460. For example, the generator model 1410 may receive a first training image 1430 and output a generated first RGB image 1440. In addition, the generator model 1410 may receive a second training image 1450 and output a generated second RGB image 1460. The discriminator model 1420 may receive a generated RGB image or a ground truth RGB image 1406 and discriminate the authenticity of the received image.

The discriminator model 1420 of the GAN may be trained to discriminate the authenticity of an RGB image input thereto during the training of the first model. Specifically, the discriminator model 1420 may update a weight of the discriminator model 1420, based on a ground truth RGB image 1406 that a raw image. In this case, a label value with which the ground truth RGB image 1406 is labeled may be a label value corresponding to a 'real' class. In addition, the discriminator model 1420 may update the weight thereof, based on an RGB image generated by processing the training image 1402 by the generator model 1410. In this case, a label value with which the generated RGB image is labeled may be a label value corresponding to a 'fake' class.

The generator model 1410 of the GAN may be trained to generate an image, which is like a real image and thus may be classified as a 'real' class, during the training of the first model. To update a weight of the generator model 1410, the electronic device 2000 may label the generated RGB image output from the generator model 1410 with a label value corresponding to the 'real' class. That is, a true label value of the generated RGB image output from the generator model 1410 corresponds to the 'fake' class but the electronic device 2000 may label the true label value of the generated RGB image as a label value corresponding to the 'real' class so as to update the weight of the generator model 1410. The electronic device 2000 may input the generated RGB image labeled with the label value corresponding to the 'real' class to the discriminator model 1420. In this case, the discriminator model 1420 may classify the input RGB image as the 'real' class when the generated RGB image labeled as the 'real' class is discriminated as a ground truth RGB image, and classify the input RGB image as the 'fake' class when the generated RGB image is discriminated as a RGB image generated by the generator model 1410. The electronic device 2000 may calculate a loss value output from the discriminator model 1420, and update the weights of the generator model 1410, based on the loss value.

Figure 15:
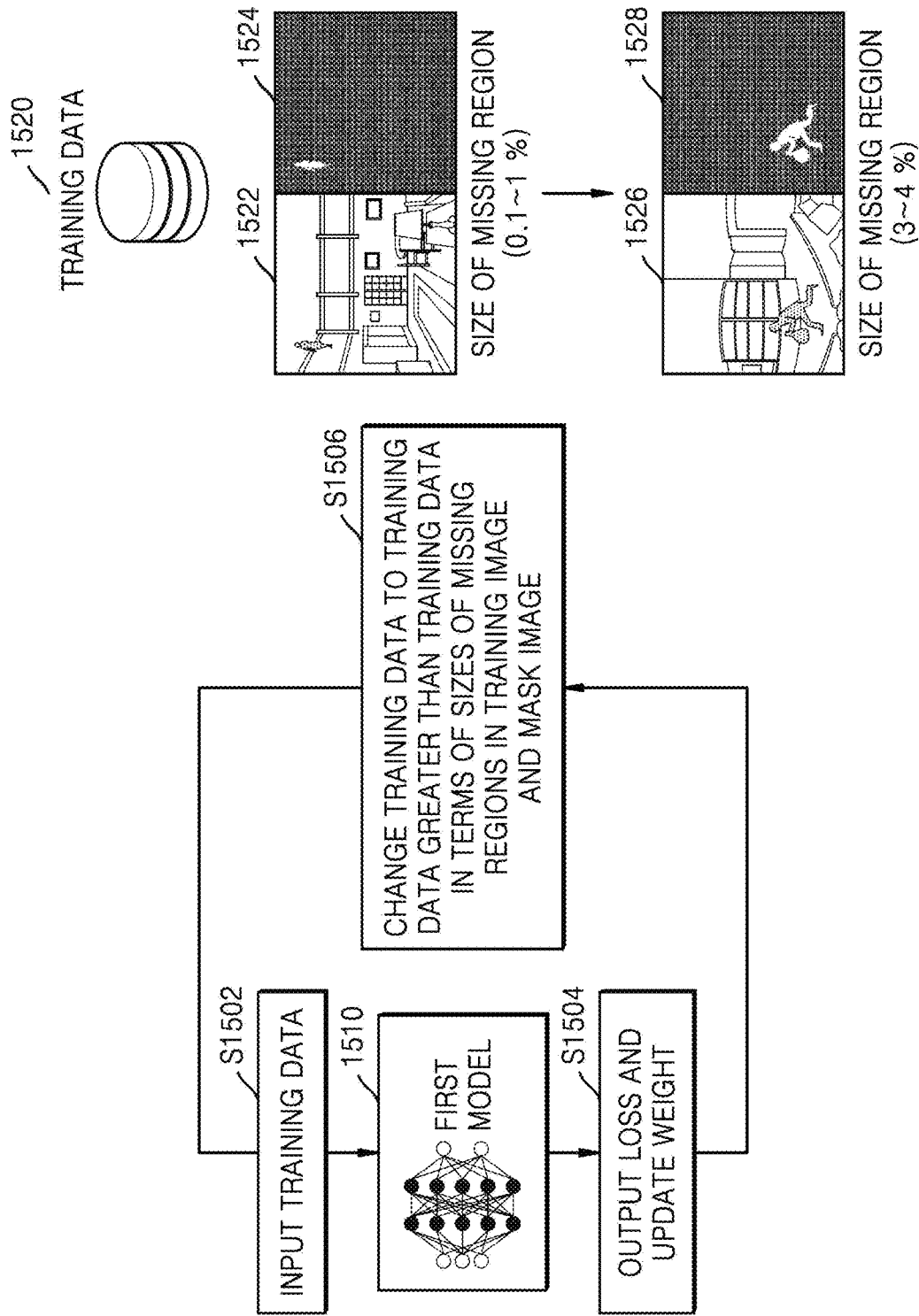
FIG. 15 is a diagram for describing a method of determining an input order of training data for training a first model when the first model is trained by an electronic device, according to an embodiment of the disclosure.

FIG. 15 is a diagram for describing a method of determining an input order of training data for training a first model when the first model is trained by an electronic device, according to an embodiment of the disclosure.

Referring to FIG. 15, training data 1520 for training a first model 1510 by the electronic device 2000 may be generated by the electronic device 2000 by pseudo-labeling data, which is not labeled with a ground truth label of a structure vector, with a label of the structure vector, and masking an image, which is pseudo-labeled with the structure vector, with a missing region. A method of masking an image, in which a structure vector is labeled, with a missing region by the electronic device 2000 will be described with reference to FIG. 16 below, and a method of pseudo-labeling data, in which the structure vector is not ground-truth-labeled, with a label of the structure vector will be described with reference to FIG. 17 below.

In an embodiment of the disclosure, the electronic device 2000 may train a first model 1510, based on training data 1520 including a training image with a missing region and a mask image corresponding to the training image and indicating the missing region.

In an embodiment of the disclosure, sizes of the missing regions in the training image and the mask image included in the training data 1520 may be different from each other. In addition, the training data 1520 may be classified, based on a size of a missing region. The training data 1520 may be classified according to a size of a missing region, e.g., a first training image 1522 and a first mask image 1524 in which the size of a missing region is 0.1% or 1% or a second training image 1526 and a second mask image 1528 in which the size of a missing region is 3% or 4%. Similarly, the training data 1520 may include a training image and a mask image that are classified according to a size of a missing region. For example, the training data 1520 may include a training image and a mask image in which a size of a missing region is 6% or 7% or a training image and a mask image in which a size of a missing region is 9% or 10%. However, the above-described training images in which the size of the missing region is 0.1% or 1%, 3% or 4%, 6% or 7%, or 9% or 10% are only examples. The sizes of the missing regions in the training image and the mask image included in the training data 1520 may be, for example, in a range of 0.1% to 10%. To perform operations S1502 to S1506 described below, the training image and the mask image included in the training data 1520 may be classified into units of pieces of training data each having a missing region of a size that is within a certain range, based on a size of a missing region.

During the training of the first model 1510, the electronic device 2000 may determine a training order of a training image to be used to train the first model 1510 according to a size of a missing region of the training image.

Operations S1502 to S1506 show a flowchart of a method of training the first model 1510 by the electronic device 2000.

In operation S1502, the electronic device 2000 according to an embodiment of the disclosure may input the training data 1520 to the first model 1510 to train the first model 1510.

In operation S1504, the electronic device 2000 according to an embodiment of the disclosure may update weights of the first model 1510, based on a loss output from the first model 1510.

In operation S1506, the electronic device 2000 according to an embodiment of the disclosure may change the training data 1520 to training data greater than the training data 1520 in terms of sizes of missing regions in a training image and a mask image. For example, the electronic device 2000 may perform an operation on all the training data 1520, perform at least one epoch with respect to an epoch, which is a unit of training for updating a weight, and thereafter change the training data 1520. As another example, the electronic device 2000 may train the first model 1510 to update a loss output and a weight for each batch, which is a data input unit for updating a loss output and a weight, and configure training data, including a missing region having a larger size, for a subsequent batch. In this case, the electronic device 2000 may perform an iteration of an operation of outputting a loss and updating a weight for each batch. It may be regarded that an epoch of training the first model 1510 is performed once when the operation is performed on all the training data 1520 by performing the operation for all batches.

The electronic device 2000 according to an embodiment of the disclosure may finely tune the first model 1510 after performing an epoch of updating a weight of the first model 1510 a plurality of times by using the training data 1520. The electronic device 2000 may perform fine tuning to train the first model 1510 by using another data set. In this case, the other data set may be a data set including images with a ground truth label of a structure vector.

Figure 16:
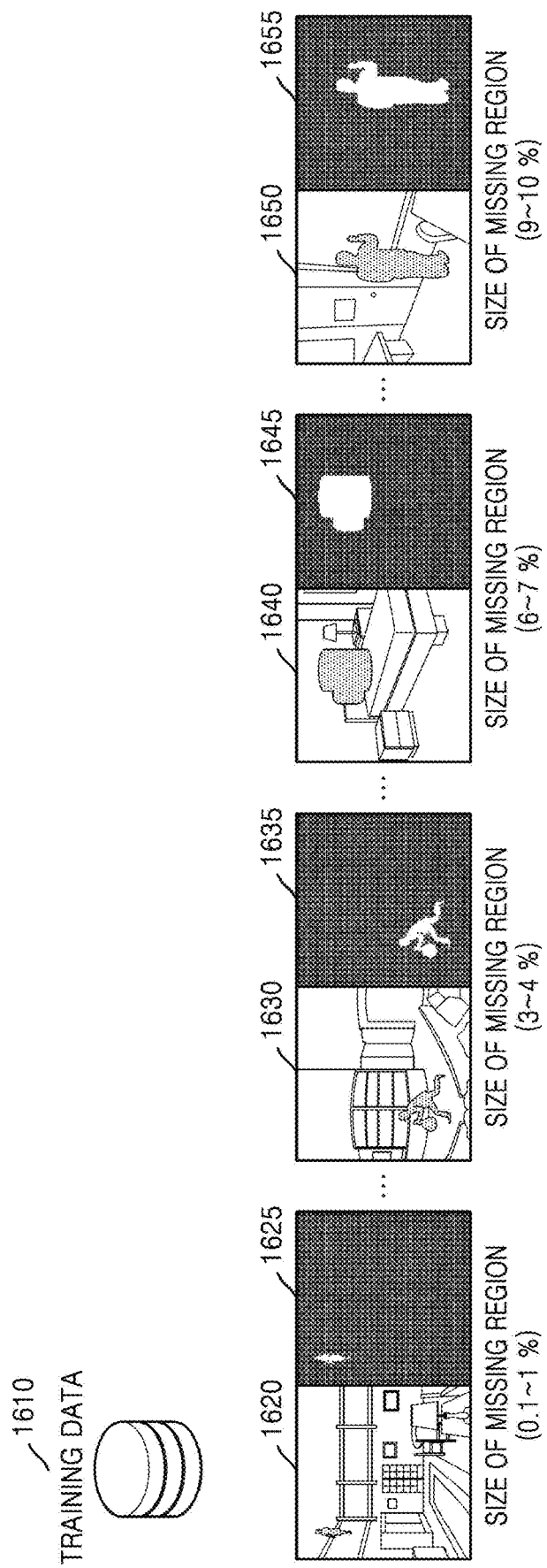
FIG. 16 is a diagram for describing a method of generating training data for training a first model by an electronic device, according to an embodiment of the disclosure.

FIG. 16 is a diagram for describing a method of generating training data for training a first model by an electronic device, according to an embodiment of the disclosure.

Referring to FIG. 16, the electronic device 2000 according to an embodiment of the disclosure may generate training data 1610 by masking an image, which is labeled with structure vectors, with a missing region. In this case, the image labeled with the structure vectors refers to a pseudo-labeled image in which structure vectors corresponding to the image are detected by extracting a structural feature from an image with no ground truth label.

A training image and a mask image included in the training data 1610 may include missing regions, and the sizes, shapes and positions of the missing regions may be variously determined. For example, the train data 1610 may include a first train image 1620 and a first mask image 1625 each having a missing region of a size of 0.1% or 1%, a second train image 1630 and a second mask image 1635 each having a missing region of a size of 3% or 4%, a third train image 1640 and a third mask image 1645 each having a missing region of a size of 6% or 7%, and a fourth train image 1650 and a fourth mask image 1655 each having a missing region of a size of 9% or 10%. However, the training images in which the size of the missing region is 0.1% or 1%, 3% or 4%, 6% or 7%, or 9% or 10% are described above as examples for convenience of description. The sizes of the missing regions in the training image and the mask image included in the training data 1520 may be, for example, in a range of 0.1% to 10%.

In an embodiment of the disclosure, the electronic device 2000 may select images for detecting structure vectors according to a certain process and label the structure vectors to obtain an image in which the structure vectors are pseudo-labeled. A method of obtaining an image in which structure vectors are pseudo-labeled will be described with reference to FIG. 17 below.

A method of generating the training data 1610 by the electronic device 2000 will be described below. For convenience of description, an image in which structure vectors are pseudo-labeled will be referred to as a "pseudo-labeled image". Because an image generated by masking a pseudo-labeled image with a missing region is a training image, the pseudo-labeled image and the training image have the same structural feature with respect to scene elements in an image.

In an embodiment of the disclosure, the electronic device 2000 may mask the pseudo-labeled image with a missing region to generate a training image with a missing region and a mask image corresponding to the training image and indicting the missing region. In this case, the electronic device 2000 may determine a size, shape, and position of the missing region masked on the pseudo-labeled image according to a structural feature (i.e., a structural feature of the training image) of the pseudo-labeled image.

In an embodiment of the disclosure, the electronic device 2000 may determine the size of the missing region in the pseudo-labeled image, based on the structural feature of the pseudo-labeled image. For example, the electronic device 2000 may determine the size of the missing region, based on structure vectors of the pseudo-labeled image, such that scene elements (e.g., structures, objects, etc.) in the pseudo-labeled image are at least partially hidden by the missing region without being entirely hidden by the missing region. In addition, the electronic device 2000 may determine the size of the missing region such that the size of the missing region is 0.1% to 10% of the size of the pseudo-labeled image.

In an embodiment of the disclosure, the electronic device 2000 may determine a shape of the missing region in the pseudo-labeled image, based on the structural feature of the pseudo-labeled image. The electronic device 2000 may determine a shape of the missing region, based on structure vectors of the pseudo-labeled image, such that scene elements (e.g., structures, objects, etc.) in the pseudo-labeled image are at least partially hidden by the missing region without being entirely hidden by the missing region. In addition, the electronic device 2000 may determine a shape of the missing region to be substantially the same as that of a certain object.

In an embodiment of the disclosure, the electronic device 2000 may determine a position of the missing region in the pseudo-labeled image, based on the structural feature of the pseudo-labeled image. The electronic device 2000 may determine a shape of the missing region, based on the structure vectors of the pseudo-labeled image, such that scene elements (e.g., structures, objects, etc.) in the pseudo-labeled image are at least partially hidden by the missing region without being entirely hidden by the missing region.

Alternatively, the electronic device 2000 may determine a random position of the missing region to be a position on the pseudo-labeled image.

The electronic device 2000 may determine the missing region, based on the structural feature of the pseudo-labeled image, when the size, shape, and position of the missing region in the pseudo-labeled image are determined. The training data 1610 for extracting structure vectors even when the pseudo-labeled image is masked with the missing region may be obtained.

That is, as in the above-described embodiments of the disclosure, the electronic device 2000 may obtain the training data 1610, based on predetermined conditions for generating the training data 1610. A training image included in the training data 1610 is pseudo-labeled with the structure vectors, and at least some of significant scene elements in the training image are maintained even after the masking of the missing region.

A method of generating a training image and a mask image by masking the pseudo-labeled image with the missing region may also apply to an image with a ground truth label of a structure vector. The electronic device 2000 may apply the methods of the above-described embodiments of the disclosure to another data set, i.e., a data set including images with the ground truth label of the structure vector. The electronic device 2000 may obtain training data, for fine-tuning, by masking each of the images with the ground truth label of the structure vector, which are included in the other data set, with the missing region. The electronic device 2000 may finely tune the first model by using training data for fine tuning. The fine tuning of the first model has been described above with reference to FIG. 15 and thus a redundant description is omitted.

Figure 17:
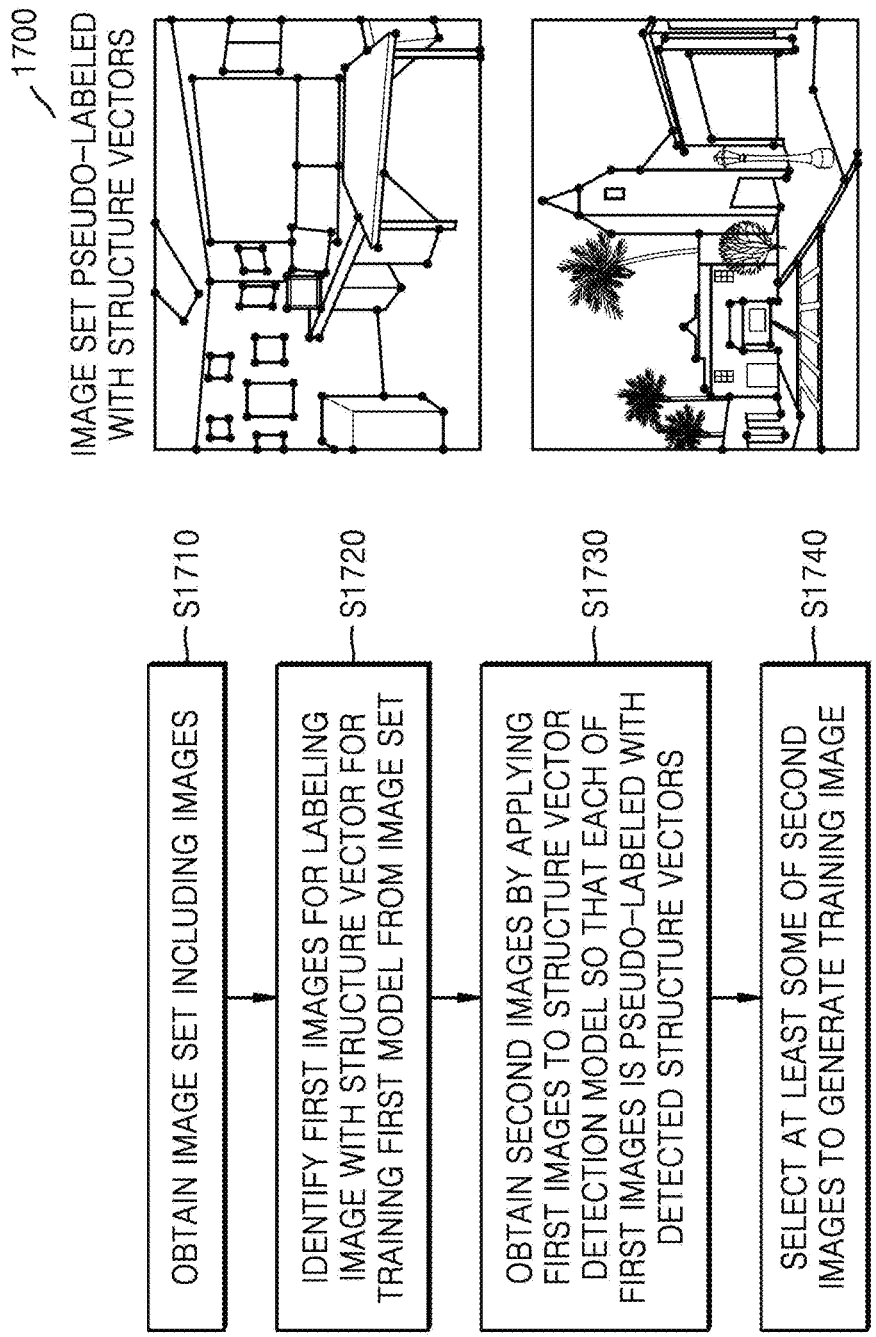
FIG. 17 is a diagram for describing a method of obtaining, by an electronic device, an image in which structure vectors are pseudo-labeled, according to an embodiment of the disclosure.

FIG. 17 is a diagram for describing a method of obtaining, by an electronic device, an image in which structure vectors are pseudo-labeled, according to an embodiment of the disclosure.

Referring to FIG. 17, in operation S1710, the electronic device 2000 according to an embodiment of the disclosure may obtain an image set including a plurality of images.

In operation S1720, the electronic device 2000 according to an embodiment of the disclosure may identify, from the image set, first images for labeling an image with a structure vector for training a first model. In this case, the images included in the image set do not include a ground truth label of the structure vector.

The electronic device 2000 may identify a scene category of each of the images included in the image set by using an image category classification model, and identify images belonging to a scene category for extraction of a structural feature as the first images.

In operation S1730, the electronic device 2000 according to an embodiment of the disclosure may obtain second images by applying the first images to a structure vector detection model so that each of the first images is pseudo-labeled with structure vectors. Here, the structure vector detection model may be a neural network model that receives an original image (e.g., an RGB image) and detects a structure vector. Alternatively, the structure vector detection model may be a neural network model trained based on a ground truth structure vector data set including images labeled which ground truth structure vectors. Pseudo-labeling refers to labeling an image, which is not labeled with a label of a structure vector, with a structure vector detected using the structure vector detection model.

The electronic device 2000 may obtain the second images pseudo-labeled with structure vectors by labeling the first images with structure vectors detected from the first images.

In operation S1740, the electronic device 2000 according to an embodiment of the disclosure may select at least some of the second images to generate a training image.

In an embodiment of the disclosure, the electronic device 2000 may generate a training image for all of the obtained second images by masking each of the second images with a missing region by the method described above with reference to FIG. 16.

In an embodiment of the disclosure, the electronic device 2000 may generate a training image by filtering some of the obtained second images according to a certain criterion to obtain third images and masking each of the third images with the missing region by the method described above with reference to FIG. 16. The electronic device 2000 may obtain the third images among the second images, based on a distribution of a reference data set including images labeled with ground truth structure vectors. The electronic device 2000 may obtain the third images among the second images, based on an average of the total numbers of lines in images labeled with ground truth structure vectors, an average of the sums of lengths of the lines in the images labeled with the ground truth structure vectors, and an average of the total numbers of junctions versus the sums of the lengths of the images labeled with the ground truth structure vectors, with respect to all data included in the reference data set. For example, the electronic device 2000 may obtain the third images by selecting, from among the second images, images in which the number of lines in an image pseudo-labeled with detected structure vectors is greater than an average of 74.98 calculated from a distribution of a reference data set including images labeled with ground truth structure vectors, the sum of lengths of all of the lines in the image pseudo-labeled with the detected structure vectors is greater than an average of 6356.57 (pixels) calculated from the distribution of the reference data set including the images labeled with the ground truth structure vectors, and the total number of junctions versus the total number of lines in the image pseudo-labeled with the detected structure vectors is less than an average of 1.34 (ratio) calculated from the distribution of the reference data set including the images labeled with the ground truth structure vectors.

The electronic device 2000 may perform operations S1710 to S1740 to obtain an image set 1700 pseudo-labeled with structure vectors, which includes images for generating training data for training the first model.

FIG. 18 is a diagram for describing a method of generating, by an electronic device, verification data for verifying the accuracy of an inpainted image obtained using a trained second model, according to an embodiment of the disclosure.

Referring to FIG. 18, the electronic device 2000 may modify some regions in an image to generate a verification image 1800 for verifying a trained first model. The electronic device 2000 may generate a verification image 1800 by masking a missing region, which corresponds to the modified regions in the image, in various ways.

For example, the electronic device 2000 may generate the verification image 1800 by masking the image with a region in the image that is randomly determined as a missing region 1810.

As another example, the electronic device 2000 may generate the verification image 1800 by detecting an object in the image and masking the image with the missing region 1810 that is randomly determined and included in a region in the image that does not overlap an existing object region 1820 identified through object detection.

As another example, the electronic device 2000 may generate the verification image 1800 by detecting an object in the image and masking the image with the existing object region 1820 determined as a missing region through object detection.

As another example, the electronic device 2000 may generate the verification image 1800 by masking the image with the missing region 1810 randomly determined and the existing object region 1820 determined through object detection.

The electronic device 2000 may evaluate the accuracy of an inpainted image, which is obtained using the generated verification image 1800 by the trained second model, numerically or qualitatively. The electronic device 2000 may re-train the second model, based on a result of the evaluation.

Figure 19:
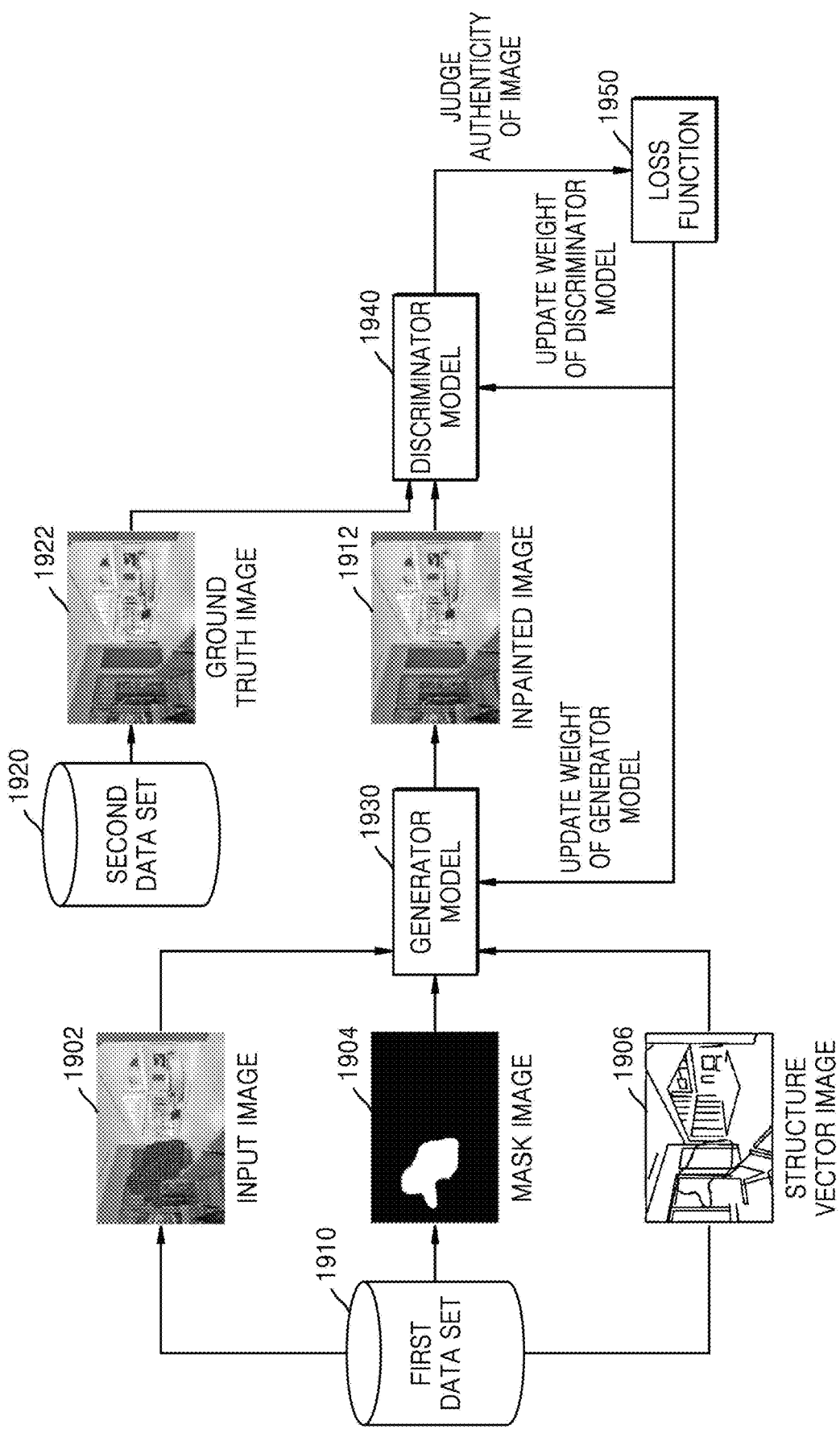
FIG. 19 is a diagram for describing a method of training a second model by an electronic device to obtain an inpainted image, according to an embodiment of the disclosure.

FIG. 19 is a diagram for describing a method of training a second model by an electronic device to obtain an inpainted image, according to an embodiment of the disclosure.

In an embodiment of the disclosure, the second model may include a GAN.

Referring to FIG. 19, a first data set 1910 may include training images each including a missing region, mask images, and structure vector images. A second data set 1920 may include ground truth images that are raw images. The electronic device 2000 according to an embodiment of the disclosure may obtain a training image 1902 with a missing region, a mask image 1904, and structure vector images 1906 from the first data set 1910.

In an embodiment of the disclosure, the electronic device 2000 may discriminate the authenticity of an image by repeatedly performing an operation to update a weight of a discriminator model 1940 a plurality of times and applying an inpainted image 1912 output from a generator model 1930 to the discriminator model 1940. The electronic device 2000 may calculate a loss value from a loss function 1950 by judging the authenticity of the inpainted image 1912, and update a weight of the generator model 1930, based on the loss value.

In an embodiment of the disclosure, the electronic device 2000 may update the weight of the discriminator model 1940.

In an embodiment of the disclosure, the electronic device 2000 may update the weight of the discriminator model 1940 for judging the authenticity of an image, based on a ground truth image 1922 obtained from the second data set 1920. In this case, a label value of the ground truth image 1922 obtained from the second data set 1920 may be 1. The label value of 1 may be understood to mean a label value corresponding to a 'real' class indicating that an image is a ground truth image that is a raw image.

In an embodiment of the disclosure, the electronic device 2000 may update the weight of the discriminator model 1940 for judging the authenticity of an image, based on the inpainted image 1912 obtained from the generator model 1930. The electronic device 2000 may obtain the training image 1902, the mask image 1904, and the structure vector images01906 included in the first data set 1910, apply the training image 1902, the mask image 1904, and the structure vector images 1906 to the generator model 1930, and obtain the inpainted image 1912 output from the generator model 1930. The electronic device 2000 may label the inpainted image 1912, which is output from the generator model 1930, with a label value '0'. In this case, the label value '0' refers to a label value corresponding to a 'fake' class representing an image inpainted by processing an input image to be reconstructed.

The electronic device 2000 according to an embodiment of the disclosure may receive the ground truth image 1922 or the inpainted image 1912, and perform an iteration of updating the weight of the discriminator model 1940.

In an embodiment of the disclosure, the electronic device 2000 may update a weight of the generator model 1930. The electronic device 2000 may apply the training image 1902, the mask image 1904, and the structure vector images 1906 to the generator model 1930, and label the inpainted image 1912 output from the generator model 1930 with a label value '1' corresponding to a 'real' class. The electronic device 2000 may apply the inpainted image 1912 labeled with the label value '1' to the discriminator model 1940 to discriminate the authenticity of the inpainted image 1912. The electronic device 2000 may obtain a loss value, based on the loss function 1950, and update the weight of the generator model 1930, based on a loss value calculated by the loss function 1950 of the discriminator model 1940.

Figure 20:
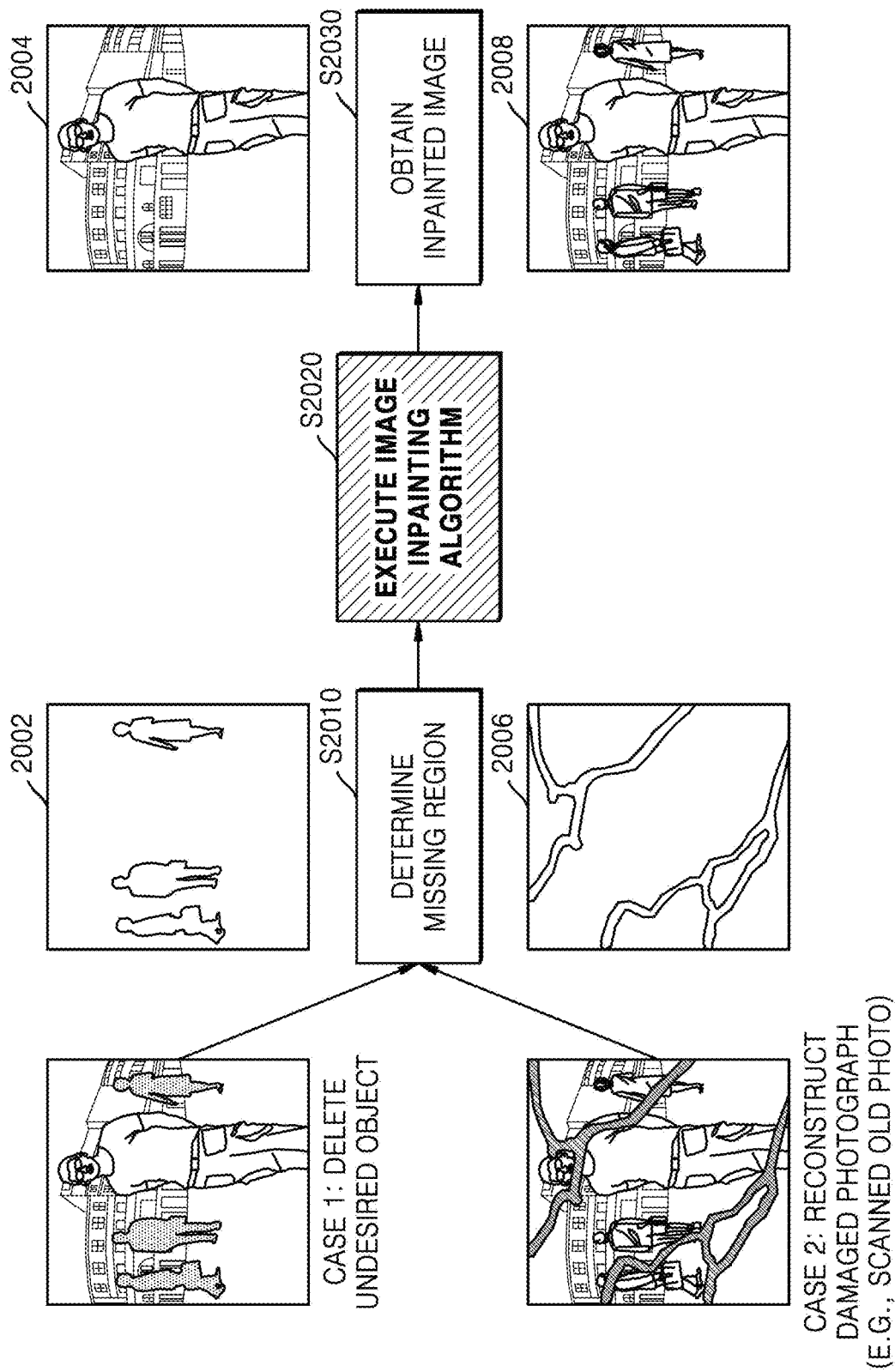
FIG. 20 is a diagram for describing performing image inpainting by an electronic device, according to an embodiment of the disclosure.

FIG. 20 is a diagram for describing performing image inpainting by an electronic device, according to an embodiment of the disclosure.

Referring to FIG. 20, in operation S2010, the electronic device 2000 according to an embodiment of the disclosure may obtain an original image and determine a missing region.

In an embodiment of the disclosure, a user of the electronic device 2000 may want to delete an undesired object in the original image. The electronic device 2000 may determine a missing region 2002 from which objects are deleted by a user by receiving an input to select objects in the original image from the user and changing pixel values of pixels corresponding to the selected objects, based on the received input.

In an embodiment of the disclosure, the user of the electronic device 2000 may want to reconstruct a damaged region in an original image that is a damaged photograph (e.g., a scanned old photo). The electronic device 2000 may receive an input to select damaged regions in the original image from the user, and determine a missing region 2006 corresponding to a damaged region, based on the received input.

Methods of determining a missing region by the electronic device 2000, based on a user input, have been described above in detail with reference to FIGS. 3 and 4 and thus a redundant description is omitted.

In operation S2020, the electronic device 2000 according to an embodiment of the disclosure may execute an image inpainting algorithm. The electronic device 2000 may obtain an inpainted image in which the missing region of an input image to be reconstructed is reconstructed, based on the determined missing region. In this case, the electronic device 2000 may perform operations S1110 to S1150 of FIG. 11 or operations S1210 to S1280 of FIG. 12.

In operation S2030, the electronic device 2000 according to an embodiment of the disclosure may obtain an inpainted image.

In an embodiment of the disclosure, when a missing region determined by the electronic device 2000 is the missing region 2002 from which the objects are deleted by the user, the electronic device 2000 may perform the image inpainting algorithm to obtain an inpainted image 2004 from which objects are deleted.

In an embodiment of the disclosure, when the missing region determined by the electronic device 2000 is a missing region 2006 corresponding to a damaged region, the electronic device 2000 may perform the image inpainting algorithm to obtain an inpainted image 2008 in which missing regions in the image are reconstructed.

Figure 21:
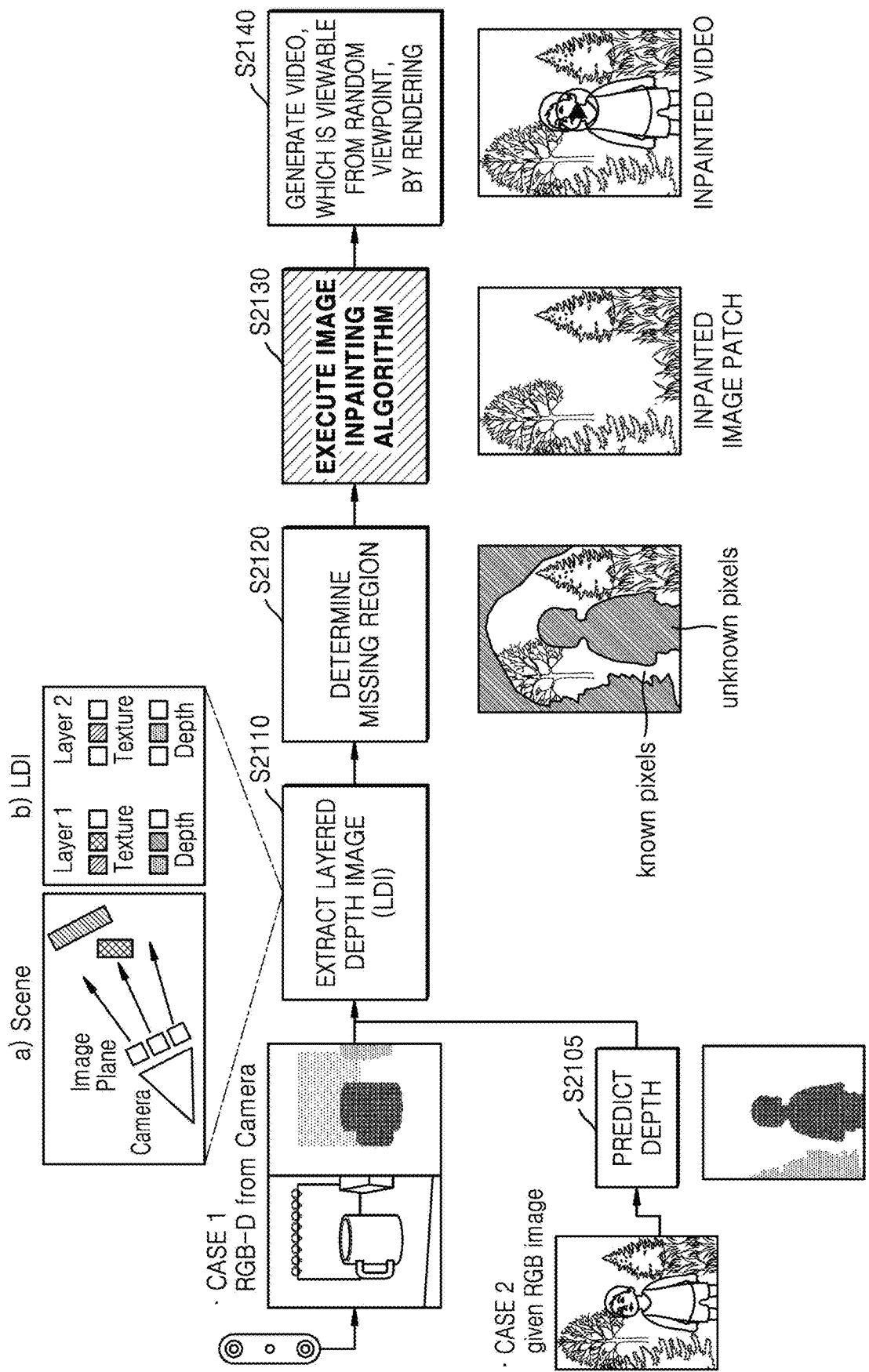
FIG. 21 is a diagram for describing performing image inpainting by an electronic device, according to an embodiment of the disclosure.

FIG. 21 is a diagram for describing performing image inpainting by an electronic device, according to another embodiment of the disclosure.

The electronic device 2000 according to an embodiment of the disclosure may obtain an image containing depth information, and obtain an inpainted video viewable from a random viewpoint different from a viewpoint from which the image was captured, based on the depth information.

Referring to FIG. 21, the electronic device 2000 may obtain depth information from an image captured by at least two cameras or obtain depth information from an image containing the depth information and captured by an RGB-depth (RGB-D) camera.

In another embodiment of the disclosure, the electronic device 2000 may obtain an RGB image and perform operation S2105 to obtain depth information.

In operation S2105, the electronic device 2000 may predict a depth of the image, based on at least one object identified in the obtained image. For example, the electronic device 2000 may identify a first depth, a second depth, . . . , and an $N^{th}$ depth, which are different depths, in an RGB image. The electronic device 2000 may obtain segmentation levels of different depths as depth information.

In operation S2110, the electronic device 2000 according to an embodiment of the disclosure may extract a layered depth image (LDI). The electronic device 2000 may obtain the LDI, based on the obtained depth information. For example, the electronic device 2000 may divide the image into a first layer image, a second layer image, a third layer image, etc. having different depths, based on the depth information.

In operation S2120, the electronic device 2000 according to an embodiment of the disclosure may determine a missing region for each LDI.

In an embodiment of the disclosure, the electronic device 2000 may determine, as a missing region, a region of a subject that is not photographed from a certain viewpoint due to a parallax occurring when the subject is viewed from different viewpoints while a camera is moved between different viewpoints. For example, when the subject is viewed by the camera in a left direction, a right region of the subject is not photographed by the camera and thus the electronic device 2000 may determine a region behind a right side of the subject hidden by the subject as a missing region. In this case, the electronic device 2000 may select one or more layer images corresponding to a depth of the region hidden by the subject from among the LDIs extracted in operation S2110, and determine a missing region in the selected one or more layer images in operation S2120.

In an embodiment of the disclosure, the electronic device 2000 may determine a region outside a boundary of an image captured by a camera as a missing region. In this case, the electronic device 2000 may select one or more layer images corresponding to a depth of a background region from among the LDIs extracted in operation S2110, and determine regions outside boundaries of the selected one or more layer images as a missing region.

In operation S2130, the electronic device 2000 according to an embodiment of the disclosure may execute an image inpainting algorithm. The electronic device 2000 may obtain one or more inpainted images in which missing regions of the one or more layer images are reconstructed, based on the determined missing region. In this case, the electronic device 2000 may perform operations S1110 to S1150 of FIG. 11 or operations S1210 to S1280 of FIG. 12.

In operation S2140, the electronic device 2000 according to an embodiment of the disclosure may generate a video viewable from a random viewpoint different from a viewpoint from which the image was captured by rendering. The electronic device 2000 may produce a visual effect in a captured image of a scene as if the scene is photographed from different viewpoints while moving a camera, based on one or more layer images on which image inpainting is performed.

Figure 22:
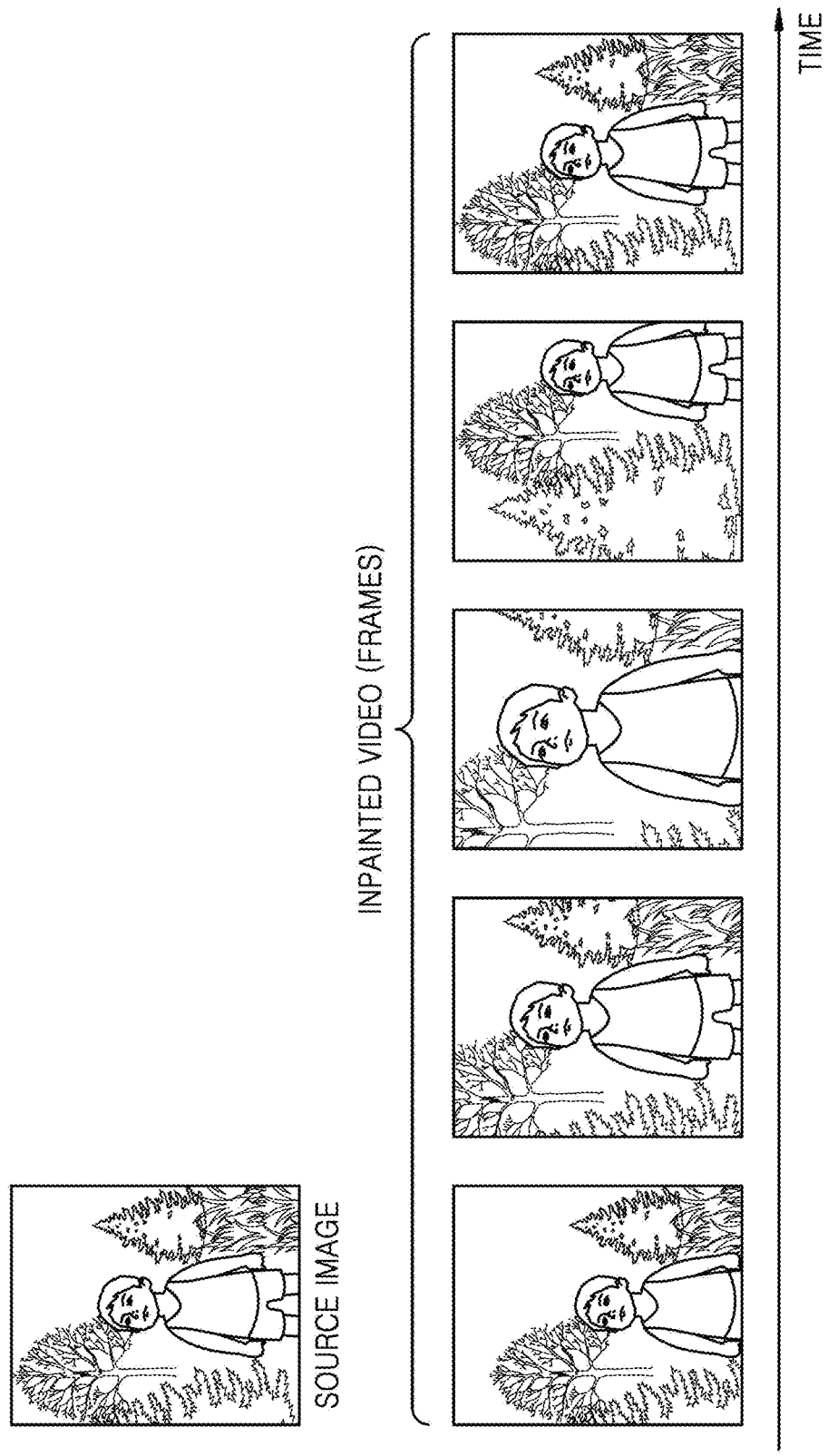
FIG. 22 is a diagram for describing an inpainted video generated by performing image inpainting by an electronic device, according to an embodiment of the disclosure.

FIG. 22 is a diagram for describing an inpainted video generated by performing image inpainting by an electronic device, according to an embodiment of the disclosure.

Referring to FIG. 22, the electronic device 2000 according to an embodiment of the disclosure may obtain an original image by photographing a subject by a camera at a particular point in time. The electronic device 2000 may obtain depth information with respect to the original image, and obtain an LDI, based on the obtained depth information.

The electronic device 2000 may determine a missing region in the LDI, and execute an inpainting algorithm for regions of the LDI to be reconstructed when a viewpoint of the camera is changed, thereby obtaining an inpainted image in which image frames of the subject when viewed from different viewpoints over time are reproduced.

Figure 23:
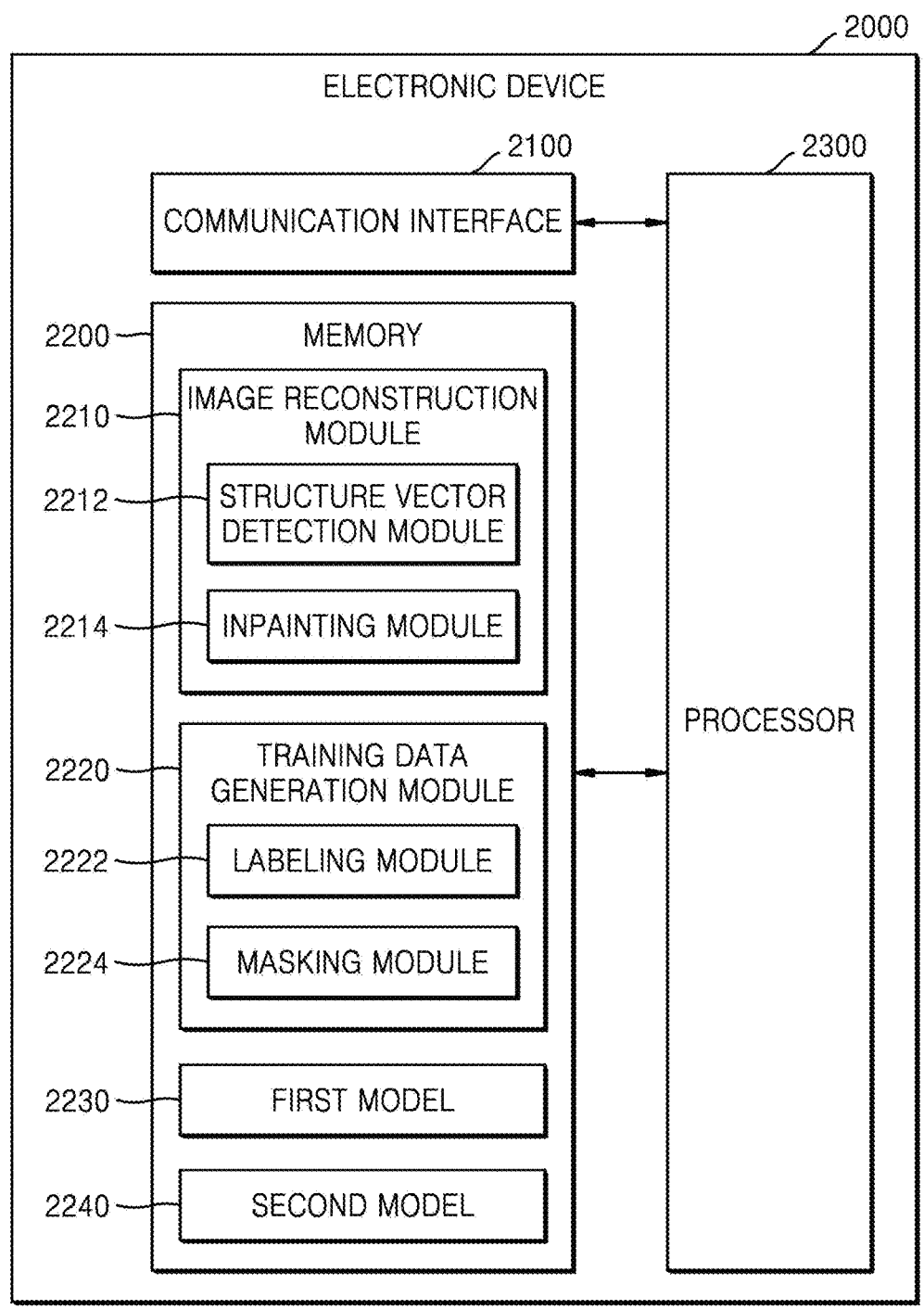
FIG. 23 is a block diagram illustrating a configuration of an electronic device according to an embodiment of the disclosure.

FIG. 23 is a block diagram illustrating a configuration of an electronic device according to an embodiment of the disclosure.

Referring to FIG. 23, an electronic device 2000 according to an embodiment of the disclosure may include a communication interface 2100, a memory 2200, and a processor 2300.

The communication interface 2100 may establish data communication with the server 3000 under control of the processor 2300. The communication interface 2100 may establish data communication with not only the server 3000 but also other peripheral electronic devices (not shown).

The communication interface 2100 may establish data communication with the server 3000 or other peripheral electronic devices through, for example, at least one of data communication methods, including a wired local region network (LAN), a Wireless LAN, Wi-Fi, Bluetooth, Zigbee, Wi-Fi Direct (WFD), infrared ray communication (IrDA, infrared data association, Bluetooth low energy (BLE), near field communication (NFC), wireless broadband Internet (Wibro), world interoperability for microwave access, (WiMAX), shared wireless access protocol (SWAP), wireless gigabit alliance (WiGig), or radio frequency (RF) communication.

The communication interface 2100 according to an embodiment of the disclosure may transmit data for image inpainting to or receive the data from an external device (not shown). For example, the communication interface 2100 may receive a first model 2230 trained in advance for detecting a structure vector and a second model 2240 for performing image inpainting from the external server 3000.

The memory 2200 may store instructions, data structures, and program codes that are readable by the processor 2300. In the embodiments of the disclosure set forth herein, operations performed by the processor 2300 may be implemented by executing instructions or codes of a program stored in the memory 2200.

The memory 2200 may include a non-volatile memory, including at least one of a flash memory type memory, a hard disk type memory, a multimedia card micro type memory, a card type memory (e.g., a secure digital (SD) or extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, or an optical disc, and a volatile memory such as a RAM or an SRAM.

In an embodiment of the disclosure, the memory 2200 may store various types of data to be used for image inpainting. For example, the memory 2200 may store an image reconstruction module 2210 for performing image inpainting, a training data generation module 2220 for training the first model 2230 and the second model 2240, the first model 2230 for extracting a structural feature of an input image to be reconstructed, and the second model 2240 for reconstructing the input image.

In an embodiment of the disclosure set forth herein, the image reconstruction module 2210 may include a structure vector detection module 2212 and an inpainting module 2214. The training data generation module 2220 may include a labeling module 2222 and a masking module 2224.

The processor 500 may control overall operations of the electronic device 2000. For example, the processor 2300 may execute one or more instructions of a program stored in the memory 2200 to control overall operations of the electronic device 2000 for performing image inpainting to reconstruct an image.

The processor 2300 may be configured as, but is not limited thereto, for example, at least one of a central processing unit, a microprocessor, a graphics processing unit, application specific integrated circuits (ASICs), digital signal processors (DSPs), digital signal processing devices (DSPDs), programmable logic devices (PLDs), field programmable gate arrays (FPGAs), an application processor (AP), a neural processing unit, or an artificial-intelligence-dedicated processor designed specially to process artificial intelligence models.

In an embodiment of the disclosure, the processor 2300 may execute the image reconstruction module 2210 to reconstruct an input image to be reconstructed.

The processor 2300 may obtain a structure vector indicating structural features of the input image by applying the input image and a mask image to the first model 2230 by using the structure vector detection module 2212 and the first model 2230. In this case, the structure vector of the input image may include a structure vector of the missing region indicating a structural feature of the missing region. Methods of obtaining a structure vector by the processor 2300 have been described in the above-described embodiments of the disclosure and thus a redundant description is omitted.

The processor 2300 may apply the input image, the mask image, and a structure vector image converted from the structure vector to the second model 2240 so as to obtain an inpainted image in which the missing region in the input image is reconstructed. Methods of obtaining an inpainted image by the processor 2300 have been described in the above-described embodiments of the disclosure and thus a redundant description is omitted.

In an embodiment of the disclosure, the processor 2300 may generate training data for training the first model 2230 and the second model 2240 by using the training data generation module 2220.

The processor 2300 may obtain an image pseudo-labeled with structure vectors by using the labeling module 2222. The processor 2300 may obtain an image set including a plurality of images with no ground truth label of a structure vector, and identify, from the image set, first images for pseudo-labeling an image with a structure vector for training the first model 2230. The processor 2300 may identify a scene category of each of the images included in the image set by using an image category classification model, and identify images belonging to a scene category for extraction of a structural feature as the first images. The processor 2300 may apply the first images to a structure vector detection model. The processor 2300 may obtain second images pseudo-labeled with structure vectors by labeling the first images with structure vectors detected from the first images. The processor 2300 may obtain third images by filtering some of the obtained second images, based on a certain criterion.

The processor 2300 may generate training data by masking the second images, which are pseudo-labeled with the structure vectors, or the third images, which are obtained by filtering some of the second images, with the missing region by using the masking module 2224. The processor 2300 may determine a size, shape, and position of the missing region to be masked, based on structural features of the second or third images, when the second or third images are masked with the missing region.

The processor 2300 may train the first model 2230 and the second model 2240, based on the training data generated using the training data generation module 2220. The training of the first model 2230 and the second model 2240 has been described in the above-described embodiments of the disclosure and thus a redundant description is omitted.

Figure 24:
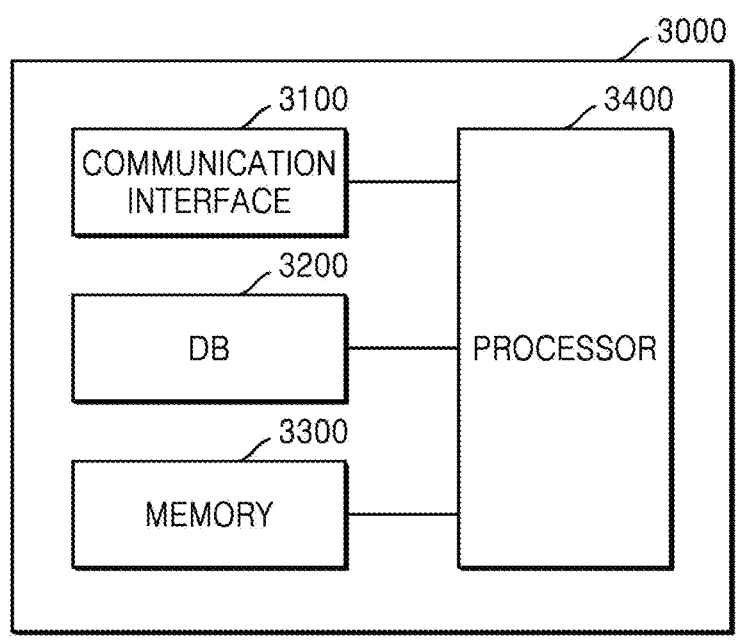
FIG. 24 is a block diagram illustrating a configuration of a server according to an embodiment of the disclosure.

FIG. 24 is a block diagram illustrating a configuration of a server according to an embodiment of the disclosure.

A server 3000 according to an embodiment of the disclosure may be interconnected with the electronic device 2000 by a wired or wireless communication method and may establish data communication.

Referring to FIG. 24, the server 3000 according to an embodiment of the disclosure may include at least a communication interface 3100, a database (DB) 3200, a memory 3300, and a processor 3400.

In an embodiment of the disclosure, the communication interface 3100 may include one or more components for communication through a local region network (LAN), a wide region network (WAN), a value-added network (VAN), a mobile radio communication network, a satellite communication network, or a combination thereof.

In an embodiment of the disclosure, the communication interface 3100 may transmit a first model and a second model to the electronic device 2000. In addition, the communication interface 3100 may receive training data from the electronic device 2000 and transmit the updated first and second models to the electronic device 2000.

The DB 3200 may store data received from the electronic device 2000 or an external device.

The DB 3200 may store training data to be used to train the first model and the second model generated by training by the server 3000.

The memory 3300 may store various data, a program, or an application for driving and controlling the server 3000. The program stored in the memory 3300 may include one or more instructions. The program (one or more instructions) or the application stored in the memory 3300 may be executed by the processor 3400. The memory 3300 may store a module that performs the same function as a module stored in the electronic device 2000.

For example, the memory 3300 may store data and program instruction codes corresponding to an image reconstruction module (not shown) and a training data generation module (not shown).

The processor 3400 may control overall operations of the server 3000. The processor 3400 according to an embodiment of the disclosure may execute one or more programs stored in the u3300.

The processor 3400 according to an embodiment of the disclosure may include an application processor (AP), a central processing unit (CPU), a graphics processing unit (GPU), a neural processor (neural processing unit), an artificial-intelligence-dedicated processor designed to have a hardware structure specialized for processing an artificial intelligence model.

The processor 3400 may perform operations that may be performed by the electronic device 2000 according to the above-described embodiments of the disclosure.

The processor 3400 may generate an inpainted image by reconstructing a missing region of an input image to be reconstructed. The processor 3400 may receive either an original image and data about a user input or an input image to be reconstructed and a mask image from the electronic device 2000, and generate an inpainted image, in which a missing region in the input image, by using the first and second models stored in the DB 3200. A method of generating an inpainted image by the server 3000 corresponds to the method of generating an inpainted image by the electronic device 2000 and thus a redundant description is omitted.

The processor 3400 may generate the first model and the second model by performing neural network model training by using the data stored in the DB 3200. The generated first and second models may be transmitted to the electronic device 2000.

Figure 25:
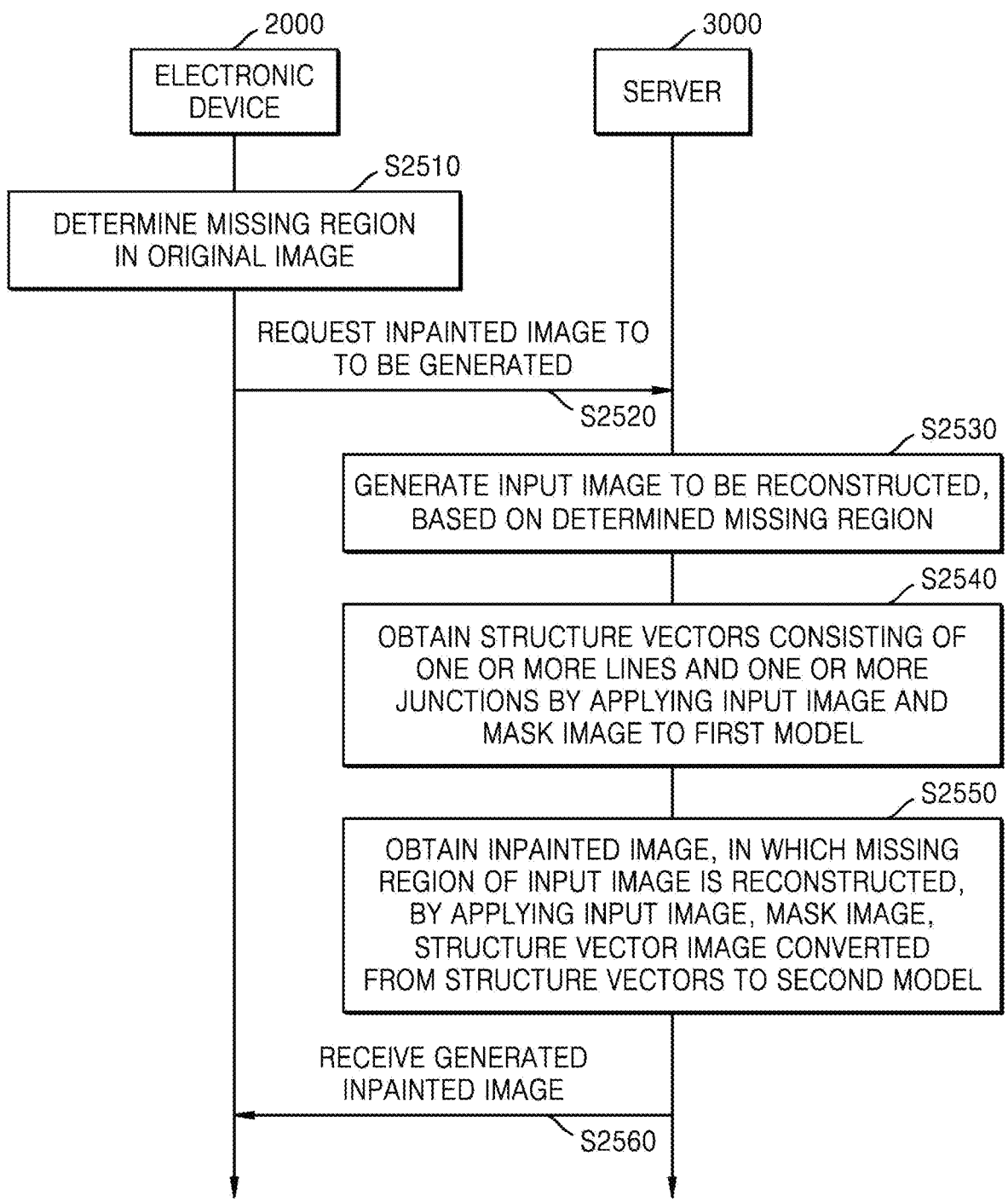
FIG. 25 is a flowchart of a method of obtaining an inpainted image from an original image by an electronic device in connection with a server, according to an embodiment of the disclosure.

FIG. 25 is a flowchart of a method of obtaining an inpainted image from an original image by an electronic device in connection with a server, according to an embodiment of the disclosure.

Referring to FIG. 25, in operation S2510, the electronic device 2000 according to an embodiment of the disclosure may determine a missing region in an original image. The electronic device 2000 may obtain the original image and determine a missing region in the original image.

The determining of the missing region by the electronic device 2000 in operation S2510 corresponds to operation S210 of FIG. 2 and thus a redundant description is omitted.

In operation S2520, the electronic device 2000 according to an embodiment of the disclosure may request the server 3000 to generate an inpainted image. The electronic device 2000 may request the server 3000 to generate an inpainted image by providing the server 3000 with, for example, an original image and information about a missing region.

In operation S2530, the electronic device 2000 according to an embodiment of the disclosure may generate an input image to be reconstructed, based on the determined missing region.

The server 3000 may generate an input image to be reconstructed, which includes the missing region, by changing pixel values of pixels corresponding to the determined missing region. In this case, the server 3000 may change pixel value of pixels corresponding to some regions to a predetermined value. For example, the server 3000 may change pixel values of pixels corresponding to some regions to 0 or an average value of pixel values of all images in training data. In addition, the server 3000 may obtain a mask image indicating the missing region. In this case, the mask image may include the missing region and a non-missing region.

However, although it is described above that in operation S2530, the electronic device 2000 requests the server 3000 to generate an inpainted image by providing the server 3000 with the original image and the information about a missing region, embodiments of the disclosure are not limited thereto. Operation S2530 may not be performed by the server 3000 but may be performed by the electronic device 2000 as described above with reference to operation S210 of FIG. 2. In this case, the server 3000 may receive an input image to be reconstructed and a mask image from the electronic device 2000.

In operation 52540, the electronic device 2000 according to an embodiment of the disclosure may obtain structure vectors consisting of one or more lines and one or more junctions by applying the input image and the mask image to the first model stored in the server 3000. The first model may be a neural network model for receiving the input image and the mask image and detecting geometric features, such as points, lines, and planes, which represent a frame structure of structures in the input image. The structure vectors may include a structural feature of the missing region identified by inferring a structural feature expected to be presented in a missing region in the input image, in which pixel values are changed. In this case, the structural feature of the missing region may be inferred from a structural feature of a region of the input image among all the regions of the image, excluding the missing region. The first model may output structure vectors associated with the entire input image including the missing region, based on the input image and the mask image.

In operation 52550, the server 3000 according to an embodiment of the disclosure may obtain an inpainted image, in which the missing region in the input image is reconstructed, by applying the input image, the mask image, a structure vector image converted from the structure vectors to the second model. The structure vectors may be output from the first model, and the server 3000 may convert the structure vectors to obtain the structure vector image. The inpainted image output from the second model may be an image obtained by filling the missing region with pixels generated to correspond to the missing region. In addition, the inpainted image may be an image obtained by reconstructing the missing region in the input image to be naturally linked to other regions of the image, i.e., to match context of the input image.

In operation S2560, the electronic device 2000 according to an embodiment of the disclosure may receive the inpainted image from the server 3000.

The block diagram of the electronic device 2000 illustrated in FIG. 23 and the block diagram of the server 3000 illustrated in FIG. 24 are block diagrams according to an embodiment of the disclosure. In the block diagrams, components may be combined together, added or omitted according to the specifications of each device actually implemented. In other words, two or more components may be combined as one component or one component may be divided into two or more components when needed. Functions performed in each block are provided to describe embodiments of the disclosure and the scope of the disclosure is not limited by specific operations and devices.

An operating method of an electronic device according to an embodiment of the disclosure may be implemented in the form of program instructions executable through various types of computer units and recorded on a computer-readable medium. The computer-readable medium may include program instructions, data files, data structures, etc. solely or in combination. The program instructions recorded on the medium may be specially designed and configured for the disclosure or may be known to and available by those of skill in computer software. Examples of the computer-readable medium include magnetic media, e.g., a hard disk, a floppy disk, and magnetic tape, optical media, e.g., compact disc (CD)-ROM and digital versatile disc (DVD), magneto-optical media, e.g., a floptical disk, and hardware devices, e.g., ROM, RAM, and flash memory, which are specially configured to store and execute program instructions. Examples of the program instructions include not only machine language code generated by a compiler but also high-level language code executable by a computer using an interpreter or the like. The computer-readable medium may be provided as a non-transitory recording medium. Here, the term "non-transitory recording medium" refers to a tangible device configured not to store signals (e.g., electromagnetic waves) and should not be understood to distinguish between a case in which data is semi-permanently stored in a recording medium and a case in which data is temporarily stored in a recording medium. For example, a 'non-transitory storage medium' may include a buffer configured to temporarily store data.

In addition, the operating methods of an electronic device according to the embodiments of the disclosure set forth herein may be provided by being included in a computer program product. The computer program product may be traded as a product between a seller and a purchaser.

The computer program product may include a software program and a computer-readable storage medium storing the software program. For example, the computer program product may include a product (e.g., a downloadable application) in the form of software program electronically distributed by an electronic device manufacturer or an electronic market (e.g., Google Play Store or App Store). For electronic distribution of the computer program product, at least part of the software program may be stored in a storage medium or temporarily generated. In this case, the storage medium may be a storage medium of a server of the manufacturer, a server of the electronic market, or a storage medium of a relay server that temporarily stores the software program.

The computer program product may include a storage medium of a server or a storage medium of a client device in a system including the server and the client device. Alternatively, when there is a third device (e.g., a smart phone) communicatively connected to the server or the client device, the computer program product may include a storage medium of the third device. Alternatively, the computer program product may include a software program transmitted from the server to the client device or the third device or transmitted from the third device to the client device.

In this case, the server, the client device, or the third device may execute the computer program product to perform the methods according to the embodiments of the disclosure set forth herein. Alternatively, two or more among the server, the client device, and the third device may execute the computer program product to perform the methods according to the embodiments of the disclosure set forth herein in a distributed method.

For example, a server (e.g., a cloud server or an artificial intelligence server) may execute a computer program product stored in the server to control a client device connected thereto through communication to perform the methods according to the embodiments of the disclosure set forth herein.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method of performing image inpainting by an electronic device to reconstruct a region in an input image to be reconstructed, the method comprising:
   determining a missing region in an original image;
   generating an input image to be reconstructed from the original image, based on the determined missing region, wherein the missing region is a portion of the input image having a smaller size than the input image;
   obtaining a mask image indicating the missing region;
   determining whether to extract a structural feature of the missing region, based on an attribute of the missing region;
   obtaining, based on the determination to extract the structural feature, structure vectors by applying the input image and the mask image to a first model to extract the structural feature of structures in the input image, wherein the structure vectors include structure vectors of the missing region, and represent the structural feature, with each structure vector including one or more lines and one or more junctions; and
   obtaining an inpainted image in which the missing region in the input image is reconstructed by applying the input image, the mask image, and a structure vector image converted from the structure vectors to a second model for reconstructing the input image.

2. The method of claim 1,
   wherein the determining of the missing region comprises:
      receiving an input to select some regions in the original image from a user, and
      determining the missing region, based on the received input, and
   wherein the generating of the input image comprises generating the input image by changing pixels corresponding to the missing region in the original image.

3. The method of claim 1, wherein the determining of whether to extract the structural feature of the missing region, based on the attribute of the missing region, comprises determining to extract the structural feature of the input image when a ratio of a number of pixels in the missing region to a number of pixels in the input image is greater than or equal to a predetermined value.

4. The method of claim 1, wherein the determining of whether to extract the structural feature of the missing region, based on the attribute of the missing region, comprises determining to extract the structural feature of the input image when a ratio of the number of pixels in the missing region to the number of pixels in the input image is greater than or equal to a predetermined value.

5. The method of claim 4, wherein the determining of whether to extract the structural feature of the missing region, based on the attribute of the missing region, further comprises:
   identifying a computing budget available for the electronic device;
   identifying a category of the input image, based on the identified computing budget; and
   determining to extract the structural feature of the missing region when the category of the input image is the same as a category of a predetermined scene.

6. The method of claim 1, further comprising:
   training data for training the first model,
   wherein the training data comprises a training image including the missing region, a mask image vector corresponding to the training image and indicating a missing region of the training image, and a structure vector corresponding to the training image.

7. The method of claim 6, further comprising:
determining a training order of the training image to be used for training the first model based on a size of the missing region.

8. The method of claim 6, wherein the first model trained using a generator model and a discriminator model,
wherein the generator model is configured to receive an input of the training image and output an red, green, blue (RGB) image, and
wherein the discriminator model is configured to receive an input of the RGB image or a ground truth RGB image and discriminate authenticity of the received training image.

9. The method of claim 6, further comprising:
determining a size, shape, and position of the missing region in the training image based on a structural feature of the training image.

10. The method of claim 6, wherein the training image is generated by:
identifying first images from an image set including a plurality of images, the first images being configured to label an image with structure vectors for training the first model;
obtaining second images by applying the first images to a structure vector detection model such that each of the first images is labeled with one of the structure vectors for training the first model; and
selecting at least some of the second images.

11. An electronic device for performing image inpainting, the electronic device comprising:
a communication interface;
a memory storing one or more instructions; and
at least one processor configured to execute the one or more instructions to:
determine a missing region in an original image,
generate an input image to be reconstructed from the original image, based on the determined missing region, wherein the missing region is a portion of the input image having a smaller size than the input image,
obtain a mask image indicating the missing region,
determine whether to extract a structural feature of the missing region, based on an attribute of the missing region,
obtain, based on the determination to extract the structural feature, structure vectors by applying the input image and the mask image to a first model to extract the structural feature of structures in the input image, wherein the structure vectors include structure vectors of the missing region, and represent the structural feature, with each structure vector including one or more lines and one or more junctions, and
obtain an inpainted image in which the missing region in the input image is reconstructed by applying the input image, the mask image, and a structure vector image converted from the structure vectors to a second model for reconstructing the input image.

12. The electronic device of claim 11, wherein the at least one processor is further configured to execute the one or more instructions to:
receive an input to select some regions in the original image from a user; and
determine the missing region, based on the received input; and
generate the input image by changing pixels corresponding to the missing region in the original image.

13. The electronic device of claim 12, wherein the at least one processor is further configured to execute the one or more instructions to determine whether to extract the structural feature of the missing region, based on a width of the missing region.

14. The electronic device of claim 11, wherein the at least one processor is further configured to execute the one or more instructions to determine to extract the structural feature of the input image when a ratio of a number of pixels in the missing region to a number of pixels in the input image is greater than or equal to a predetermined value.

15. The electronic device of claim 11,
wherein the at least one processor is further configured to execute the one or more instructions to train the first model based on training data, and
wherein the training data comprises a training image including the missing region, a mask image vector corresponding to the training image and indicating a missing region of the training image, and a structure vector corresponding to the training image.

16. The electronic device of claim 15, wherein the at least one processor is further configured to execute the one or more instructions to determine a training order of the training image to be used for training the first model based on a size of the missing region.

17. The electronic device of claim 15,
wherein the first model is trained using a generator model and a discriminator model,
wherein the generator model is configured to receive the training image and output an RGB image, and
wherein the discriminator model is configured to receive the RGB image or a ground truth RGB image and discriminate authenticity of the received training image.

18. The electronic device of claim 15, wherein the at least one processor is further configured to execute the one or more instructions to determine a size, shape, and position of the missing region in the training image based on the structural feature of the training image.

19. The electronic device of claim 15, wherein the training image is generated by:
identifying first images from an image set including a plurality of images, the first images being configured to label an image with structure vectors for training the first model;
obtaining second images by applying the first images to a structure vector detection model such that each of the first images is labeled with one of the structure vectors for training the first model; and
selecting at least a some of the second images.

20. A non-transitory computer-readable recording medium storing a program, which when executed by a computer causes the computer to perform the following operations:
determining a missing region in an original image;
generating an input image to be reconstructed from the original image, based on the determined missing region, wherein the missing region is a portion of the input image having a smaller size than the input image;
obtaining a mask image indicating the missing region;
determining whether to extract a structural feature of the missing region, based on an attribute of the missing region;

obtaining, based on the determination to extract the structural feature, structure vectors by applying the input image and the mask image to a first model to extract the structural feature of structures in the input image, wherein the structure vectors include structure vectors of the missing region, and represent the structural feature, with each structure vector including one or more lines and one or more junctions; and obtaining an inpainted image in which the missing region in the input image is reconstructed by applying the input image, the mask image, and a structure vector image converted from the structure vectors to a second model for reconstructing the input image.

\* \* \* \* \*